United States Patent
Petersen et al.

(10) Patent No.: US 12,496,007 B2
(45) Date of Patent: Dec. 16, 2025

(54) APPARATUS AND METHOD FOR MONITORING PERIPHERAL DIABETIC NEUROPATHY AND/OR PERIPHERAL ARTERIAL DISEASE

(71) Applicant: Podimetrics, Inc., Somerville, MA (US)

(72) Inventors: Brian Petersen, Somerville, MA (US); Katherine Wood, Meredith, NH (US); David Linders, Waltham, MA (US); Min Zhou, Somerville, MA (US)

(73) Assignee: Podimetrics, Inc., Somerville, MA (US)

( * ) Notice: Subject to any disclaimer, the term of this patent is extended or adjusted under 35 U.S.C. 154(b) by 282 days.

(21) Appl. No.: 17/144,756

(22) Filed: Jan. 8, 2021

(65) Prior Publication Data
US 2021/0212628 A1   Jul. 15, 2021

Related U.S. Application Data

(60) Provisional application No. 62/958,858, filed on Jan. 9, 2020.

(51) Int. Cl.
*A61B 5/00* (2006.01)
*A61B 5/01* (2006.01)
*A61B 5/02* (2006.01)

(52) U.S. Cl.
CPC .......... *A61B 5/4041* (2013.01); *A61B 5/0077* (2013.01); *A61B 5/015* (2013.01);
(Continued)

(58) Field of Classification Search
CPC .......... A61B 5/4842; A61B 2560/0252; A61B 2562/04; A61B 5/015; A61B 5/4041;
(Continued)

(56) References Cited

U.S. PATENT DOCUMENTS

| 4,574,359 A | 3/1986 | Ishizaka et al. |
| 4,592,000 A | 5/1986 | Ishizaka et al. |

(Continued)

FOREIGN PATENT DOCUMENTS

| CN | 1308225 A | 8/2001 |
| CN | 201312800 Y | 9/2009 |

(Continued)

OTHER PUBLICATIONS

Chanjuan Liu, Jaap J. van Netten, Jeff G. van Baal, Sicco A. Bus, Ferdi van der Heijden, "Automatic detection of diabetic foot complications with infrared thermography by asymmetric analysis," J. Biomed. Opt. 20(2) 026003 (Feb. 11, 2015) https://doi.org/10.1117/1.JBO.20.2.026003 (Year: 2015).*

(Continued)

*Primary Examiner* — Matthew Kremer
*Assistant Examiner* — Jonathan M Haney
(74) *Attorney, Agent, or Firm* — Nutter McClennen & Fish LLP

(57) ABSTRACT

The bottom surface of a patient's foot makes contact with the receiving region of a device body to cause a set of temperature sensors to produce a current set of temperature values. Four or more earlier sets of temperature values produced at earlier times for the bottom surface of the patient's foot are accessed. Next, after setting a normalization reference for the earlier sets of temperature values and the current set of temperature values to produce normalized data, the normalized data is transformed into model information representing the progression of PDN or PAD. That model information is used to ascertain the trajectory of the patient's PDN or PAD.

34 Claims, 14 Drawing Sheets

(52) U.S. Cl.
CPC ........ *A61B 5/02007* (2013.01); *A61B 5/4842* (2013.01); *A61B 2560/0252* (2013.01); *A61B 2562/0271* (2013.01); *A61B 2562/04* (2013.01)

(58) Field of Classification Search
CPC .............. A61B 5/0077; A61B 5/02007; A61B 2562/0271; A61B 5/01
USPC ........................................................ 600/555
See application file for complete search history.

(56) References Cited

U.S. PATENT DOCUMENTS

| | | | |
|---|---|---|---|
| 4,629,336 A | 12/1986 | Ishizaka | |
| 4,647,918 A | 3/1987 | Goforth | |
| 4,648,055 A | 3/1987 | Ishizaka et al. | |
| 4,669,472 A | 6/1987 | Eisenmenger | |
| 4,843,577 A | 6/1989 | Muramoto | |
| 4,866,621 A | 9/1989 | Ono | |
| 4,878,184 A | 10/1989 | Okada et al. | |
| 5,011,294 A | 4/1991 | Yamaguchi | |
| 5,015,102 A | 5/1991 | Yamaguchi | |
| 5,066,141 A | 11/1991 | Ikeda et al. | |
| 5,070,932 A | 12/1991 | Vlasak | |
| 5,259,389 A | 11/1993 | Muramoto et al. | |
| 5,352,039 A | 10/1994 | Barral et al. | |
| 5,473,629 A | 12/1995 | Muramoto | |
| 5,642,096 A | 6/1997 | Leyerer et al. | |
| 5,678,566 A | 10/1997 | Dribbon | |
| 5,929,332 A | 7/1999 | Brown | |
| 6,090,050 A | 7/2000 | Constantinides | |
| 6,195,921 B1 | 3/2001 | Truong | |
| 6,398,740 B1 | 6/2002 | Lavery et al. | |
| 6,547,746 B1* | 4/2003 | Marino | A61B 5/377 600/545 |
| 6,631,287 B2 | 10/2003 | Newman et al. | |
| 6,767,330 B2 | 7/2004 | Lavery et al. | |
| 6,807,869 B2 | 10/2004 | Farringdon et al. | |
| 6,963,772 B2 | 11/2005 | Bloom et al. | |
| 7,052,472 B1 | 5/2006 | Miller et al. | |
| 7,167,734 B2 | 1/2007 | Khalil et al. | |
| 7,206,718 B2 | 4/2007 | Cavanagh et al. | |
| 7,318,004 B2 | 1/2008 | Butterfield | |
| 7,637,657 B2 | 12/2009 | Yamamoto et al. | |
| 7,716,005 B2 | 5/2010 | Shoureshi et al. | |
| 7,726,206 B2 | 6/2010 | Terrafranca, Jr. et al. | |
| 7,758,523 B2 | 7/2010 | Collings et al. | |
| 8,360,987 B2 | 1/2013 | Kantro et al. | |
| 8,868,157 B1* | 10/2014 | Soliz | A61B 5/4029 600/475 |
| 9,095,305 B2 | 8/2015 | Engler et al. | |
| 9,259,178 B2 | 2/2016 | Bloom et al. | |
| 9,271,672 B2 | 3/2016 | Linders et al. | |
| 9,326,723 B2 | 5/2016 | Petersen et al. | |
| 2002/0082486 A1 | 6/2002 | Lavery et al. | |
| 2003/0092975 A1* | 5/2003 | Casscells, III | A61B 5/412 600/300 |
| 2006/0021261 A1 | 2/2006 | Face | |
| 2006/0030783 A1 | 2/2006 | Tsai et al. | |
| 2007/0038273 A1 | 2/2007 | Bales et al. | |
| 2007/0039211 A1 | 2/2007 | Pichler | |
| 2007/0043408 A1 | 2/2007 | Winnett et al. | |
| 2007/0225614 A1* | 9/2007 | Naghavi | A61B 5/01 600/549 |
| 2008/0109183 A1 | 5/2008 | Shoureshi et al. | |
| 2008/0214962 A1 | 9/2008 | Kantro et al. | |
| 2009/0082694 A1* | 3/2009 | Poisner | A61B 5/4827 600/555 |
| 2009/0219972 A1 | 9/2009 | Carlsson et al. | |
| 2009/0306801 A1 | 12/2009 | Sivak et al. | |
| 2010/0004566 A1 | 1/2010 | Son et al. | |
| 2010/0041998 A1 | 2/2010 | Postel | |
| 2010/0198022 A1 | 8/2010 | Vuillerme et al. | |
| 2010/0268111 A1 | 10/2010 | Drinan et al. | |
| 2010/0324455 A1 | 12/2010 | Rangel et al. | |
| 2011/0015498 A1 | 1/2011 | Mestrovic et al. | |
| 2011/0214501 A1 | 9/2011 | Ross et al. | |
| 2011/0275956 A1 | 11/2011 | Son et al. | |
| 2011/0313314 A1* | 12/2011 | Gefen | A61B 5/441 600/555 |
| 2012/0109013 A1 | 5/2012 | Everett et al. | |
| 2012/0190989 A1 | 7/2012 | Kaiser et al. | |
| 2012/0221286 A1 | 8/2012 | Bisch et al. | |
| 2013/0019503 A1 | 1/2013 | Vogt | |
| 2013/0211281 A1 | 8/2013 | Ross et al. | |
| 2013/0231577 A1* | 9/2013 | Leiderman | A61B 7/04 600/485 |
| 2013/0261494 A1 | 10/2013 | Bloom et al. | |
| 2015/0057562 A1* | 2/2015 | Linders | A61B 5/015 600/549 |
| 2015/0359457 A1 | 12/2015 | Blumenthal et al. | |
| 2016/0100790 A1 | 4/2016 | Cantu et al. | |
| 2016/0192844 A1 | 7/2016 | Linders et al. | |
| 2016/0256056 A1* | 9/2016 | Petersen | A61B 5/0022 |
| 2017/0127999 A1* | 5/2017 | Linders | G01K 13/20 |
| 2018/0014734 A1* | 1/2018 | Rogers | A61B 5/389 |
| 2018/0103851 A1* | 4/2018 | Tzvieli | G01J 5/0806 |

FOREIGN PATENT DOCUMENTS

| | | |
|---|---|---|
| CN | 202263087 U | 6/2012 |
| CN | 104219994 A | 12/2014 |
| CN | 110049716 A | 7/2019 |
| DE | 20 2010 013176 U1 | 2/2011 |
| DE | 202014105408 U1 | 11/2014 |
| EP | 885587 A1 | 12/1998 |
| EP | 1511419 B1 | 8/2008 |
| EP | 3130284 A1 | 2/2017 |
| JP | S55-071919 A | 5/1980 |
| JP | H03-275039 A | 12/1991 |
| JP | 2002-269231 A | 9/2002 |
| JP | 2004-528085 A | 9/2004 |
| JP | 2005-533543 A | 11/2005 |
| JP | 2009-539454 A | 11/2009 |
| KR | 101027367 B1 | 4/2011 |
| RU | 2433783 C2 | 11/2011 |
| WO | 2007114768 A1 | 10/2007 |
| WO | 2008058051 A2 | 5/2008 |
| WO | 2009005373 A1 | 1/2009 |
| WO | 2010021932 A2 | 2/2010 |
| WO | 2012051394 A1 | 4/2012 |
| WO | 2012084814 A1 | 6/2012 |
| WO | 2015143218 A1 | 9/2015 |

OTHER PUBLICATIONS

Visual Footcare Technologies, LLC. "TempStat," Visual Footcare Technologies, LLC, Thermal Imaging Device, One unit: $125, undated, 1 page.
Wallace, G., et al., "The Use of Smart Phone Thermal Imaging for Assessment of Peripheral Perfusion in Vascular Patients" Annals of Vascular Surgery (accepted manuscript) 2017, 18 pages.
International Search Report and Written Opinion for International Application No. PCT/US2021/012698 mailed Apr. 2, 2021, 19 pages.
Ammer et al. Thermal Imaging of Skin Changes on the Feet of Type II Diabetics, 2001 Conference Proceedings of the 23rd Annual International Conference of the IEEE Engineering in Medicine and Biology Society, Istanbul, Turkey, Oct. 25-28, 2001, 4 pages.
Armstrong et al. Monitoring Healing of Acute Charcot's Arthropathy with Infrared Dermal Thermometry, Journal of Rehabilitation Research and Development, vol. 34, No. 3, Jul. 1997, pp. 317-321.
Bagavathiappan, S., et al., "Correlation between Plantar Foot Temperature and Diabetic Neuropathy: A Case Study by Using an Infrared Thermal Imaging Technique," Journal of Diabetes Science and Technology, vol. 4, Issue 6, Nov. 2010, 7 pages.
Balbinot, L., et al., "Plantar Thermography is Useful in the Early Diagnosis of Diabetic Neuropathy," 2012 Clinics, pp. 1419-1425, 7 pages.
Balbinot, L., et al., "Repeatability of Infrared Plantar Thermography in Diabetes Patients: A Pilot Study," Journal of Diabetes Science Technology, vol. 7, Issue 5, Sep. 2013, pp. 1130-1137, 9 pages.

(56) References Cited

OTHER PUBLICATIONS

Bharara et al. "Coming events cast their shadows before: detecting inflammation in the acute diabetic foot and the foot in remission," Diabetes/Metabolism Research and Reviews, vol. 28, pp. 15-20.
Bharara, M. Bharara, M—P—Technology Summary, 5 pages, undated.
Brioschi et al. "Automated Computer Diagnosis of IR Medical Imaging," FLIR Technical Series, Application Note for Research & Science, FLIR Systems, Inc., 2011.
Caselli, M.D. et al. "The Forefoot-to-Rearfoot Plantar Pressure Ratio is Increased in Severe Diabetic Neuropathy and Can Predict Foot Ulceration," Diabetes Care, vol. 25, No. 6, Jun. 2002, pp. 1066-1071.
Cavalheiro, A., et al., Thermographic Analysis and Autonomic Response in the Hands of Patients with Leprosy, An Bras Dermatol, 2016, 274-283, 10 pages.
Chen et al. "Development of a Thermal and Hyperspectral Imaging System for Wound Characterization and Metabolic Correlation," John Hopkins Apl Technical Digest, vol. 26, No. 1, 2005, pp. 67-74.
Chien et al. "Selection and ordering of feature observations in a pattern recognition system." Info and Control 12, No. 5. 1968, pp. 394-414.
Dabiri et al. "Electronic Orthotics Shoe: Preventing Ulceration in Diabetic Patients," 30th Annual International IEEE EMBS Conference, Aug. 2008, pp. 771-774.
Engler. "Rock Health Presentation" of Aug. 24, 2012, 19 pages.
Engler. Declaration of Jeffrey M. Engler under 37 CFR § 1.56, Feb. 28, 2016, 2 pages.
Evans, A.L., et al., "Thermography in Lower Limb Arterial Disease," Clin. Radiol. (1976) vol. 27, 6 pages.
Frykberg et al. Feasibility and Efficacy of a Smart Mat Technology to Predict Development of Diabetic Plantar Ulcers, Diabetes Care, vol. 40, Jul. 2017, pp. 973-980.
Gatt, A., et al., "The Application of Medical Thermography to Discriminate Neuroischemic Toe Ulceration in the Diabetic Foot," The International Journal of Lower Extremity Wounds, 2018, 4 pages.
Gatt, A., et al., "The Identification of Higher Forefoot Temperatures Associated with Peripheral Arterial Disease in Type 2 Diabetes Mellitus as Detected by Thermography," Primary Care Diabetes, 2018, 7 pages.
Gatt, A., et al., "Establishing Differences in Thermographic Patterns between the Various Complications in Diabetic Foot Disease," Hindawi International Journal of Endocrinology, vol. 2018, Article ID 98208295, 8 pages.
Hauer, J., "Hand Skin Blood Flow in Diabetic Patients With Automatic Neuropathy and Microangiopathy," Diabetes Care, vol. 14, No. 10, Oct. 1991, 6 pages.
Ilo, A., et al., "Infrared Thermography and Vascular Disorders in Diabetic Feet," Journal of Diabetes Science and Technology, 2019, 9 pages.
Ilo, A., et al., "Infrared Thermography and Vascular Disorders in Diabetic Feet," Journal of Diabetes Science and Technology, 2020, vol. 14, 9 pages.
International Search Report and Written Opinion for International Application No. PCT/US2013/030997, dated Jul. 8, 2013, 13 pages.
International Search Report and Written Opinion for International Application No. PCT/US2016/060638 dated Mar. 2, 2017, 11 pages.
International Search Report and Written Opinion for International Application No. PCT/US2019/056325, dated Dec. 23, 2019.
Isaac et al. "Angiosomal Interpretation of Dermal Thermometry in Patients at High Risk for Diabetic Foot Ulcers." in 2018 Diabetic Limb Salvage Conference, 1 page.
Kaabouch et al. "Predicting neurpathic ulceration: analysis of static temperature distributions in thermal images," Journal of biomedical Optics, vol. 15, Sec. 6, 2010, pp. 061715-1-061715-6.
Lavery et al. Unilateral remote temperature monitoring to predict future ulceration for the diabetic foot in remission. BMJ Open Diabetes Research and Care, 7(1), 2019, 7 pages.
Lin, P, et al., "Assessment of Lower Extremity Ischemia Using Smartphone Thermographic Imaging", Journal of Vascular Surgery Cases and Innovative Techniques, Dec. 2017, 4 pages.
Liu et al., "Automatic detection of diabetic foot complications with infrared thermography by asymmetric analysis," Journal of Biomedical Optics, 20(2), 2015 (11 pages).
Liu et al. "Infrared Dermal Thermography on Diabetic Feet Soles to Predict Ulcerations: a Case Study," Proc. Of SPIE, vol. 8572, 2013, pp. 85720N01-85720N-9.
Liu et al. "Statistical analysis of spectrial data: a methodology for designing an intelligent monitoring system for the diabetic foot," Predicting neuropathic ulceration: analysis of static temperature distributions in thermal images, Journal of Biomedical Opitcs, vol. 18(12), Dec. 2013, pp. 126004-1-126004-11.
McLoughlin, G., et al., "Thermography in the Diagnosis of Occlusive Vascular Disease of the Lower Limb," Brit. J. Surg., Aug. 1973, vol. 60, No. 8, 2 pages.
Medgadget.com "TempTouch for Foot Ulcer Detection," Xilas, Inc., Apr. 19, 2005, 2 pages.
Morley et al. "In Shoe-Multisensory Data Acquisition System," IEEE Transactions on Biomedical Engineering, vol. 48, No. 7, Jul. 2001, pp. 815-820.
Notice of Opposition to a European Patent—European Patent No. 2833783B1, dated May 31, 2018, 8 pages.
Park, E., et al., "Comparison of Sympathetic Skin Response and Digital Infrared Thermographic Imaging in Peripheral Neuropathy," Yonsei Medical Journal, vol. 35, No. 4, 1994, 9 pages.
Peleki, A., et al., "Novel Use of Smartphone-based Infrared Imaging in the Detection of Acute Limb Ischaemia," EJVES Short Reports (2016) 32, 3 pages.
Roback "An overview of temperature monitoring devices for early detection of diabetic foot disorders," Linkoping University Post Print, 2010, 18 pages.
Sagaidachnyi, A., et al., "Thermography-based Blood Flow Imaging in Human Skin of the Hands and Feet: A Spectrum Filtering Approach," Institute of Physics and Engineering in Medicine, Physiol. Meas. 38 (2017), 18 pages.
Schmidt, B., et al., "Describing Normative Foot Temperatures in Patients With Diabetes-Related Peripheral Neuropathy," Journal of Diabetes Science and Technology 2020, vol. 14, 6 pages.
Sebastian, A. et al., "Clinical Features, Radiological Characteristics and Offloading Modalities in Stage0 Acute Charcot's Neuroarthropathy—A Single Centre Experience from South India," Diabetes & Metabolic Syndrome: Clinical Research & Review, 13 (2019), 5 pages.
Siren Care "Siren Care—Best Diabetic Socks Tracking Your Foot Health," http://siren.care/how-it-works, Jan. 6, 2017, 4 pages.
Staffa, E., "Infrared Thermography as Option for Evaluating the Treatment Effect of Percutaneous Transluminal Angioplasty by Patients with Peripheral Arterial Disease," Vascular Online, first published on Mar. 17, 2016, 8 pages.
Supplementary European Search Report for Application No. EP 13772800, dated Jun. 26, 2015, 7 pages.
Supplementary European Search Report for European U.S. Appl. No. 16/863,080, dated Apr. 30, 2019 (12 pages).
Theuma, F., et al., The Use of Smartphone-attached Thermography Camera in Diagnosis of Acute Lower Limb Ischemia, Society for Vascular Surgery, 1 page.
Van Netten et al. "Infrared Thermal Imaging for Automated Detection of Diabetic Foot Complications" Journal of Diabetes Science and Technology, vol. 7, Issue 5, Sep. 2013, pp. 1122-1129.
Extended European Search Report for PCT/US2021/012698 dated Mar. 14, 2024, 14 pages.
Canadian Intellectual Property Office, Examiner's Report for application No. 3165916 dated Oct. 22, 2024, 4 pages.
European Patent Office Communication pursuant to Article 94(3) EPC for Application No. 21738260.5, dated Jul. 21, 2025, 10 pages.
China National Intellectual Property Administration (CNIPA) First Office Action for Application No. 20218001892.4 dated Dec. 13, 2024, 14 pages.

(56) References Cited

OTHER PUBLICATIONS

China National Intellectual Property Administration (CNIPA) Second Office Action for Application No. 20218001892.4 dated Jul. 3, 2025, 16 pages.

* cited by examiner

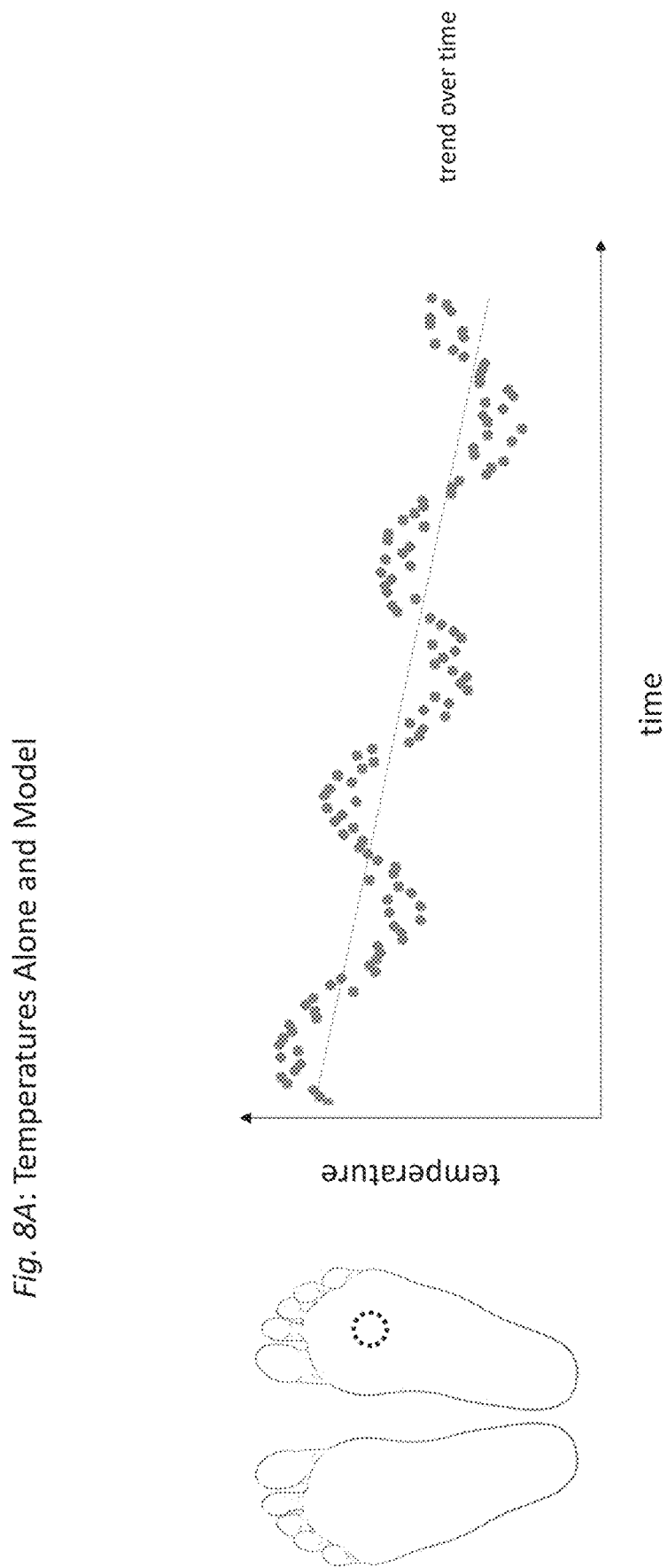
Fig. 8A: Temperatures Alone and Model

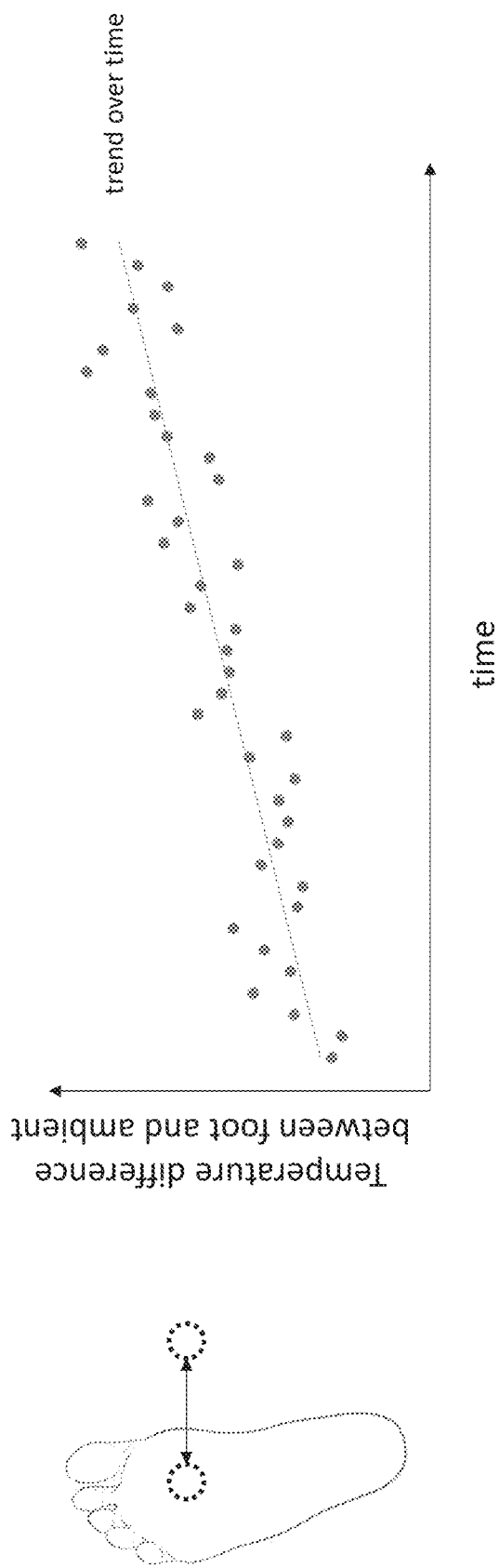
FIG. 8B: Ambient Reference and Model

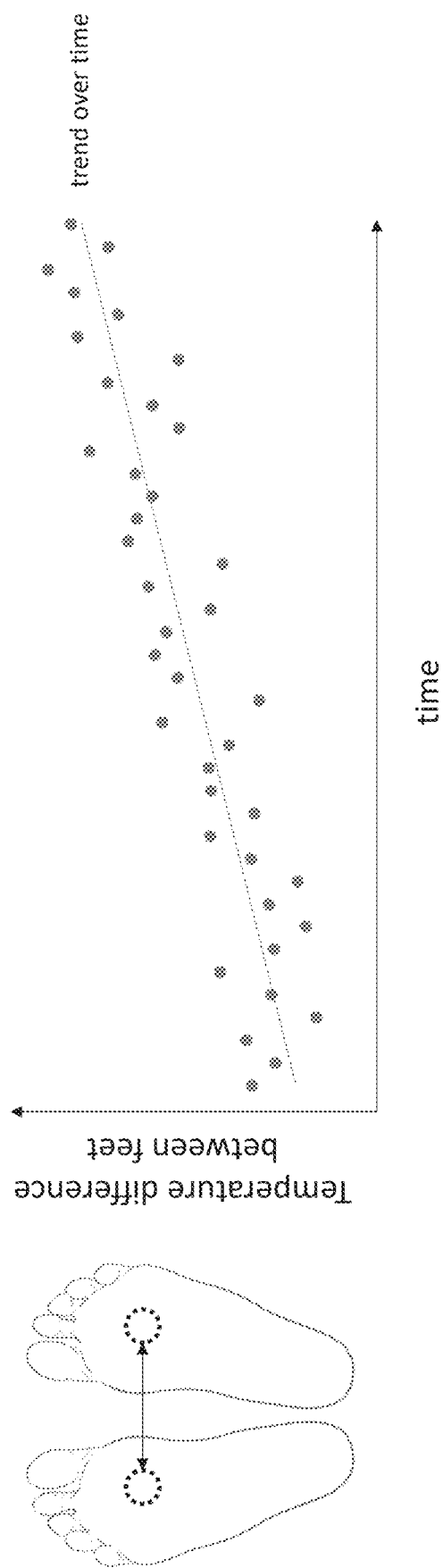
FIG. 8C: Contralateral Reference and Model

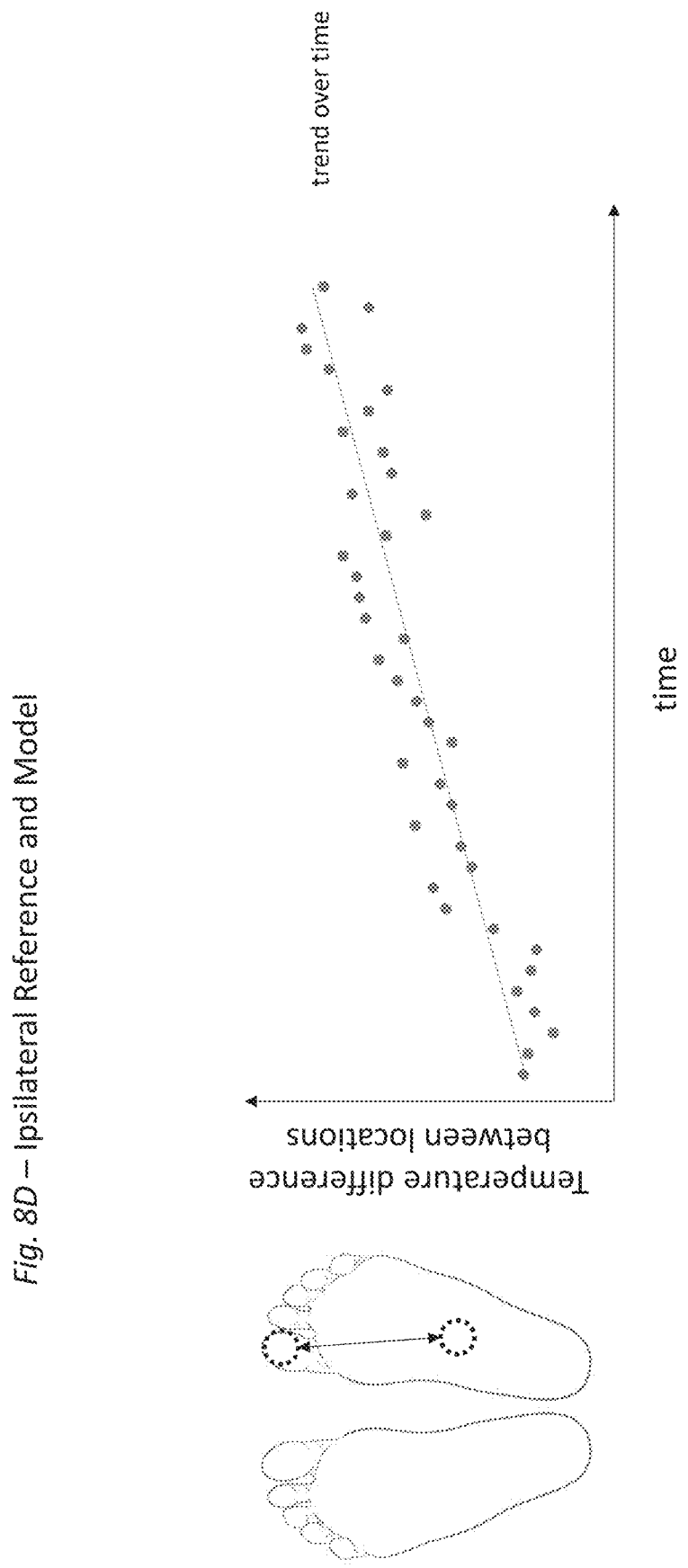
Fig. 8D – Ipsilateral Reference and Model

APPARATUS AND METHOD FOR MONITORING PERIPHERAL DIABETIC NEUROPATHY AND/OR PERIPHERAL ARTERIAL DISEASE

PRIORITY

This patent application claims priority from provisional U.S. patent application No. 62/958,858, filed Jan. 9, 2020, entitled, "APPARATUS AND METHOD FOR IDENTIFYING AND MONITORING PROGRESSION OF PERIPHERAL DIABETIC NEUROPATHY AND/OR PERIPHERAL ARTERIAL DISEASE," and naming Brian Petersen, Katherine Wood, David Linders, and Min Zhou as inventors, the disclosure of which is incorporated herein, in its entirety, by reference.

FIELD OF THE INVENTION

Illustrative embodiments of the generally relate to peripheral diabetic neuropathy and/or peripheral arterial disease and, more particularly, various embodiments of the invention relate to monitoring peripheral diabetic neuropathy and/or peripheral arterial disease.

BACKGROUND OF THE INVENTION

Poorly managed diabetes mellitus results in serious health complications affecting the limbs of the body. Two such complications are diabetic peripheral neuropathy and diabetic peripheral arterial disease. Peripheral neuropathy can result in loss of protective sensation in the extremities and thus, increased likelihood for developing wounds to the feet, ankles, and legs. These wounds can become infected and chronic, potentially resulting in gangrene, cellulitis, amputation of the foot or leg, and in some cases, death. Peripheral arterial disease is characterized by impaired circulatory pathways and reduced blood flow to the extremities. Peripheral arterial disease impairs wound healing and can result in gangrene, claudication, ischemia, amputation, and death.

Healthcare professionals therefore recommend routine evaluation of patients with diabetes mellitus for the presence of peripheral arterial disease and peripheral neuropathy, among other complications. Diagnostic tests identify these complications and are typically administered during clinical exam in an outpatient setting. However, both peripheral neuropathy and peripheral arterial disease are progressive diseases, and many patients with diabetes mellitus are not assessed for these complications with recommended frequency.

SUMMARY OF VARIOUS EMBODIMENTS

In accordance with one embodiment of the invention, a method and/or apparatus monitors peripheral diabetic neuropathy ("PDN") and/or peripheral arterial disease ("PAD") of a patient having a foot with a bottom surface. To that end, the method provides a body having a base with a top surface having a receiving region configured to receive the bottom of the foot. The base forms an open platform or a closed platform. Moreover, the body has a set of temperature sensors in communication with the top surface of the receiving region. The set of temperature sensors preferably are within the receiving region and configured to activate after receipt of a stimulus applied to one or both the open or closed platform and the set of temperature sensors. The set of temperature sensors also is configured to thermally communicate with the bottom of the foot within the receiving region to ascertain a current temperature at each of a set of different locations of the bottom of the foot. In addition, the set of temperature sensors is configured to produce a set of temperature values with each location having one associated temperature value.

The method and/or apparatus also contacts the bottom surface of the patient's foot with the receiving region to cause the set of temperature sensors to produce a current set of temperature values, and accesses four, five, or more earlier sets of temperature values produced at earlier times for the bottom surface of the patient's foot. Next, after setting a normalization reference for each of the earlier sets of temperature values and for the current set of temperature values to produce normalized data, the method/apparatus transforms the normalized data into model information representing the progression of PDN or PAD. Using that model information, the method/apparatus ascertains the trajectory of the patient's PDN or PAD.

Each of the earlier sets of temperature values may be temporally spaced from other earlier sets of temperature data values by a time period of at least one day. Moreover, the method/apparatus may set a normalization reference by applying a normalizing function to the earlier sets of temperature values and the current set of temperature values using the normalization reference. Among other things, the normalizing reference can include a contralateral temperature value (from the other foot), an ipsilateral temperature value (e.g., from the same foot), and/or an ambient temperature.

Those skilled in the art can access significantly more than four earlier sets. For example, the method/apparatus may access between four earlier sets and 10,000 earlier sets (or more, such as 20,000). The method/apparatus may transform any of a variety of ways. For example, some embodiments transform by selecting a model to characterize the plurality of earlier sets of temperature values and the current set of temperature values as a simpler system, and then applying the model to the plurality of earlier sets of temperature values and current set of temperature values to produce the model information.

After ascertaining the trajectory, some embodiments predict, using the model information, the future status of PDN or PAD for the patient relative to the current set of temperature values. Among other things, the trajectory may include one or both of the rate of change of the model information and the magnitude of the model information. Moreover, some embodiments transform and ascertain, as noted above for PDN only, or for PAD alone.

The earlier set of temperature values can be produced by any number of sources. For example, they may be produced using the set of temperature sensors, from some other source(s), or from both the set of temperature source and some other source.

In another embodiment, a monitor manages peripheral diabetic neuropathy ("PDN") and/or peripheral arterial disease ("PAD") of a patient having a foot with a bottom surface. To that end, the monitor has a body with a base having a top surface. The top surface has a receiving region configured to receive the bottom of the foot, and the base forms an open platform or a closed platform. The body has a set of temperature sensors in communication with the top surface of the receiving region. The set of temperature sensors are spaced apart within the receiving region and configured to activate after receipt of a stimulus applied to one or both the open or closed platform and the set of temperature sensors. Moreover, the set of temperature sensors is configured to thermally communicate with the bottom of the foot within the receiving region to ascertain a current temperature at each of a set of different spaced apart locations of the bottom of the foot. The set of temperature sensors also is configured to produce a set of temperature values with each location having one associated temperature value, and produce a current set of temperature values after contacting the receiving region with the bottom surface of the patient's foot.

The monitor also has an input configured to receive four or more earlier sets of temperature values produced at earlier times for the bottom surface of the patient's foot, and a normalizer configured to set a normalization reference for the earlier sets of temperature values and the current set of temperature values to produce normalized data. The monitor further has a modeler operatively coupled with the normalizer. The modeler is configured to transform the normalized data into model information representing the progression of PDN or PAD to ascertain, using the model information, the trajectory of the patient's PDN or PAD.

Illustrative embodiments of the invention are implemented as a system and/or a computer program product having a computer usable medium with computer readable program code thereon. The computer readable code may be read and utilized by a computer system in accordance with conventional processes.

In other embodiments, a non-contact method and/or apparatus monitors peripheral diabetic neuropathy ("PDN") and/or peripheral arterial disease ("PAD") of a patient having a foot with a bottom surface. To that end, the method/apparatus provides a thermal camera having an infrared radiation sensor, and directs the infrared radiation sensor toward the bottom surface of the patient's foot to produce a current thermal image data set. The current thermal image data set is considered to represent a current temperature across the bottom surface of the foot. The method/apparatus accesses four or more earlier thermal image data sets produced at earlier times for the bottom surface of the patient's foot, and sets a normalization reference for the earlier sets of thermal image data sets and the current thermal image data set to produce normalized data. Next, the method/apparatus transforms the normalized data into model information representing the progression of PDN or PAD, and then ascertains, using the model information, the trajectory of the patient's PDN or PAD.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8A graphically shows an example of foot temperatures and a model of those temperatures in one embodiment of the invention.

FIG. 8B graphically shows an example of temperature values normalized with an ambient normalization reference and a model of those normalized temperature values in accordance with one embodiment of the invention.

FIG. 8C graphically shows an example of temperature values normalized with a contralateral normalization reference and a model of those normalized temperature values in accordance with one embodiment of the invention.

FIG. 8D graphically shows an example of temperature values normalized with an ipsilateral normalization reference and a model of those normalized temperature values in accordance with one embodiment of the invention.

DESCRIPTION OF ILLUSTRATIVE EMBODIMENTS

Figure 1:
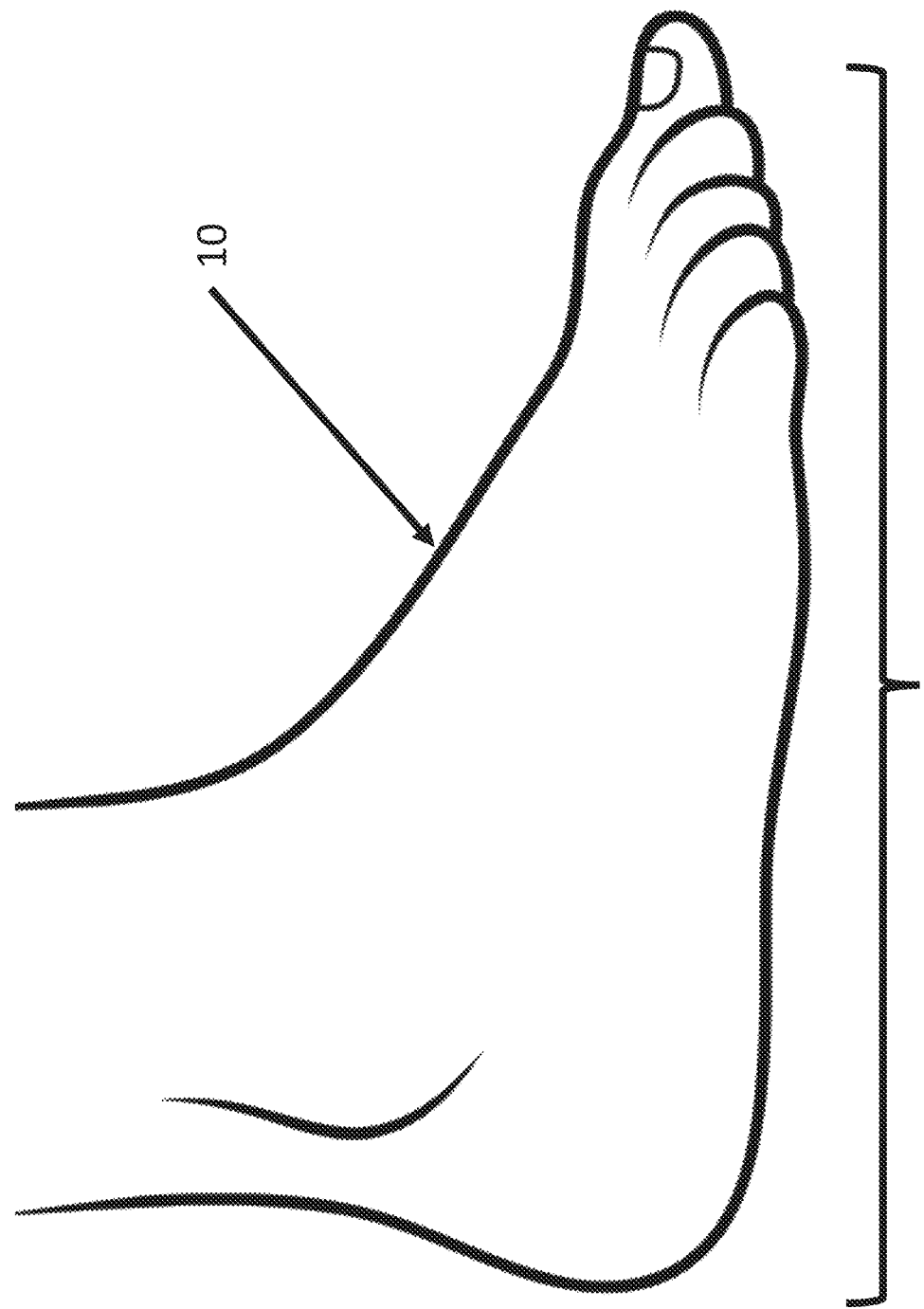
FIG. 1 schematically shows an example of a foot having PAD and PDN.

In illustrative embodiments, a method (and/or apparatus) effectively monitors the progression of one or both peripheral diabetic neuropathy ("PDN") and/or peripheral arterial disease ("PAD"). Knowledge of this progression enables a patient to take earlier action, when necessary, with the goal of an improved therapeutic benefit. To that end, the method (and/or apparatus) gathers several sets of earlier temperature values of the patient's foot (e.g., one set of temperature values from each of the past four days), and a set of current temperature values (e.g., the most recently obtained set of temperature values) for the same patient's foot. All the sets of temperature data preferably relate to the same locations on the patient's foot.

The method (and/or apparatus) then normalizes the sets of temperature values and transforms those normalized data into model information identifying health trends. Accordingly, using the model information, the illustrative embodiments may ascertain the trajectory of the patient's PDN or PAD, effectively enabling earlier medical intervention than permitted by prior art monitoring techniques known to the inventors. Details of illustrative embodiments are discussed below.

PAD is a complication characterized by impaired circulatory pathways and reduced blood flow. Cases of PAD can be mild or progress to severe impairment; in many cases, PAD causes limited physical capability and significantly lowers quality of life. Furthermore, infection and impaired wound healing are far more prevalent due to poor macrocirculation and microcirculation. PAD can often advance into critical limb ischemia (CLI), a severe vascular complication that is commonly accompanied by gangrene, often requires amputation, and is linked to a high rate of mortality.

PAD is often progressive, affecting the most distal parts of the extremities, such as the toes, prior to more proximal parts of the extremities, such as the heel. Other complications related to vascular disease in the extremities include thrombosis, embolism, claudication, and arteriosclerosis.

As PAD progresses, the arterial vessels that feed blood into the extremities become compromised through narrowing, partial occlusion, or complete blockage. As a result, oxygenated blood flow into the feet is reduced over time. This disease progression is associated with worsening conditions described above. If not treated in a timely manner, it can lead to insufficient tissue oxygenating flow, resulting in an inability to heal diseased or damaged tissue and, ultimately, cell death. In many cases, timely clinical intervention is required to prevent further tissue damage, infection, or amputation. This progression may occur slowly over months or years, as in the case of arteriosclerosis, or rapidly over weeks or days, as in the case of thrombosis or embolism. The resulting changes in blood flow may affect a whole limb if the compromised vessel is large and proximal. Alternatively, the blood flow may be reduced to just a portion of the limb if the compromised vessel is smaller and distal.

Changes in vascular health that result in compromised flow to the limb or portion of the limb effectively reduces the volumetric flow of warm, oxygenated blood reaching the distal tissues fed by the affected arteries. Accordingly, those distal tissues are often less oxygenated and not as well thermoregulated as healthy tissues. In cold environments, this may manifest as colder than normal extremities. Alternatively, in hot environments, this may manifest as warmer than normal extremities. In extreme cases, this inability to thermoregulate can allow the tissue to overheat, break down, and lead to acute damage such as foot ulcers.

Traditionally, a diagnosis of PAD is made using the Ankle Brachial Pressure Index (ABPI), which is determined from the ratio of blood pressure measured at the ankle compared to the upper arm. ABPI can be an unreliable technique due to arterial calcification and sclerosis, lack of standards for measurement and calculation, position of patient during measurement, location of pressure cuff on the ankle, bilateral or contralateral measurements, and other influencers. It also is not possible in some situations, such as those with trauma injuries or unhealed wounds. If the arteries are calcified, toe pressure can be measured, though not for patients that have suffered previous amputation of the toes. Other methods of diagnosis include Doppler ultrasound and fluorescein and Laser Doppler flowmetry, both of which are complicated and expensive as well as variable. MRI and angiography can also be used, but produce static images of blood flow.

Furthermore, certain vascular interventions, such as angioplasty and stenting, with the aim of permanently improving blood flow to an extremity, sometimes fail or deteriorate after a period of time. As a result, the vascular flow to the extremity may improve for a short duration and then diminish over a period of time. In this period after the intervention, but before the next clinical evaluation, there is presently no technique or device known to the inventors for evaluating vascular health in the extremities to determine if the intervention is holding. If the intervention does not persist, the condition may lead to revisions or additional vascular operations and greater cost and morbidity.

Peripheral neuropathy ("PN," also manifested and referred to as "peripheral diabetic neuropathy," or "PDN") is a comorbidity of diabetes that causes impaired sensory nerve function, commonly involving damaged nerve pathways of a patient's hands and feet. The nerve damage impacts direct nerve contact with the brain from the extremities through the spinal cord. PDN oftentimes can be caused by diabetes mellitus where high amounts of sugar and fats in the blood, due to poorly-controlled blood glucose, degrade the functioning of neurons. This complication can lead to diabetic foot ulcers and other foot complications due to a critical lack of sensation in the feet. Patients also report extremely hot or cold feelings, tingling, or pain in their feet as a symptom of PDN. Patients with PDN generally are at higher risk for morbidity. As with PAD, PDN is often progressive, affecting the most distal parts of the extremities, such as the toes, prior to more proximal parts of the extremities such as the heel.

As PDN progresses, the autonomic nervous system, which mediate vasodilation and vasoconstriction in the extremities, becomes dysfunctional. An overactive sympathetic nerve responsible for mediating a vessel may eventually cause damage to the vessel. Other neuropathic conditions reduce the system's ability to dilate or constrict blood vessels in response to the body's needs such as changing environmental temperature. Therefore, a limb affected by PDN will not thermoregulate as efficiently as a healthy limb. In other cases, inflammation may not be effectively regulated in a limb with PDN leading to widespread inflammation in the whole limb. Both of these conditions may be observed as abnormal temperatures in the extremities both at rest and in response to a change in environmental temperature.

Furthermore, PDN reduces the function of motor neurons which may result in reduced muscle tone in the feet and leading to deformations and gait issues. These, if uncorrected, cause high pressure points on the feet which may cause further damage to the underlying tissues.

PDN typically progresses slowly, over the course of months or years, and is difficult to accurately diagnose or monitor. Regularly assessing changes in neuropathic conditions are necessary to help the patient and healthcare provider implement footwear and lifestyle changes to prevent injury to the feet.

PDN is currently diagnosed using one of several methods, most of which involve the patient being able to sense different degrees of stimuli. A 10-gram Semmes Weinstein Monofilament utilizes sense of touch to determine loss of protective sensation by applying a blunt stimulus to different locations on a patient's foot. Each monofilament takes a certain amount of force to bend, which the patient cannot feel if PDN is present. Some medical institutions have used a biothesiometer to quantitatively measure the vibration perception threshold of a patient. Similarly, physicians sometimes use a 128 Hz vibratory tuning fork to make a PDN assessment. The ability to distinguish warm versus cool temperatures on the bottom of the feet has also been used to identify PDN.

It can be difficult to diagnose PDN and PAD because they can often be asymptomatic, and many patients with diabetes do not receive adequate and recommended routine screening for these complications. In many instances, currently known devices known to the inventors generally are unable to make an adequate diagnoses. Illustrative embodiments made technical modifications to underlying devices, however, to provide an improved screening and monitoring of PDN and PAD.

Furthermore, there is no standard test for PDN or PAD evaluation, and there is high variability among the different diagnostics used by healthcare professionals. Finally, the diagnostics which do exist are most commonly administered by a healthcare professional during clinical exam and are designed to diagnose the complication, not predict the complication or monitor for progression and increasing severity of these complications.

Thus, patients who have been diagnosed with these complications remain at risk for changes in neurological and vascular status that can result in poor and costly outcomes, such as foot ulceration, gangrene, critical limb ischemia, and amputation.

These patients consequently can suffer from a significant problem that the prior art known to the inventors cannot solve: they cannot rely on the traditional devices and approaches for identifying common complications of diabetes, such as PDN and PAD, to monitor for progression. Among other reasons, this deficiency lies in the design of existing devices and techniques, which are configured for use in the clinic and to be administered by a trained healthcare professional. Illustrative embodiments solve these problems by producing a device and applying techniques that analyze the temperatures of the lower extremity to predict, identify, and monitor the progression of PDN and PAD.

Specifically, illustrative embodiments analyze a patient's foot to predict or determine the presence and progression of PDN or PAD. This permits patients, their healthcare providers, and/or their caregivers to intervene earlier, reducing the risk of more serious complications. To that end, a temperature detection modality (e.g., an open or closed platform that measures the temperature of a surface) receives the patient's foot and generates temperature data that is processed to determine whether PDN or PAD emerged, and/or the progression of previously diagnosed PAD or PDN. The modality may use any of a variety of different processes, such as comparing one or more portions of the foot or leg to some prescribed other value, such as the environmental/ambient temperature or the temperature of another portion of the body.

Using that comparison, if the modality determines that the extremity presents at least one of a number of prescribed patterns, then various embodiments produce output information indicating whether PDN or PAD will or has emerged, and/or the trajectory of PDN or PAD. This output information may also indicate whether known PAD or PDN has progressed. Details of illustrative embodiments are discussed below.

To analyze an extremity or extremities, illustrative embodiments may use modalities and techniques similar to those discussed in U.S. Pat. No. 9,271,672, the disclosure of which is incorporated herein, in its entirety, by reference. For example, FIG. 1 schematically shows a patient's foot 10 that, undesirably, has peripheral neuropathy (PDN) 12 and peripheral arterial disease (PAD) 14 secondary to diabetes. These complications may have associated sequelae such as thrombosis, foot ulceration, ischemia, and many others known to those skilled in the art.

Figure 2A:
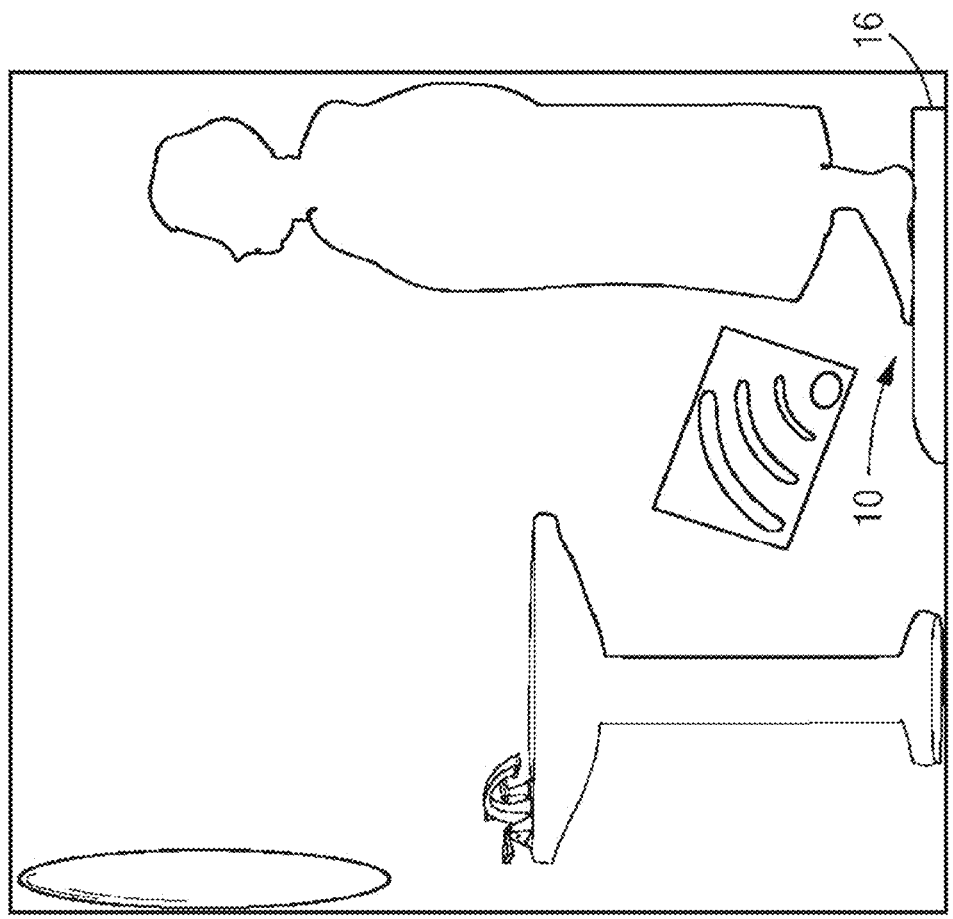
FIG. 2A schematically shows one use and form factor that may be implemented in accordance with illustrative embodiments of the invention.
Figure 2B:
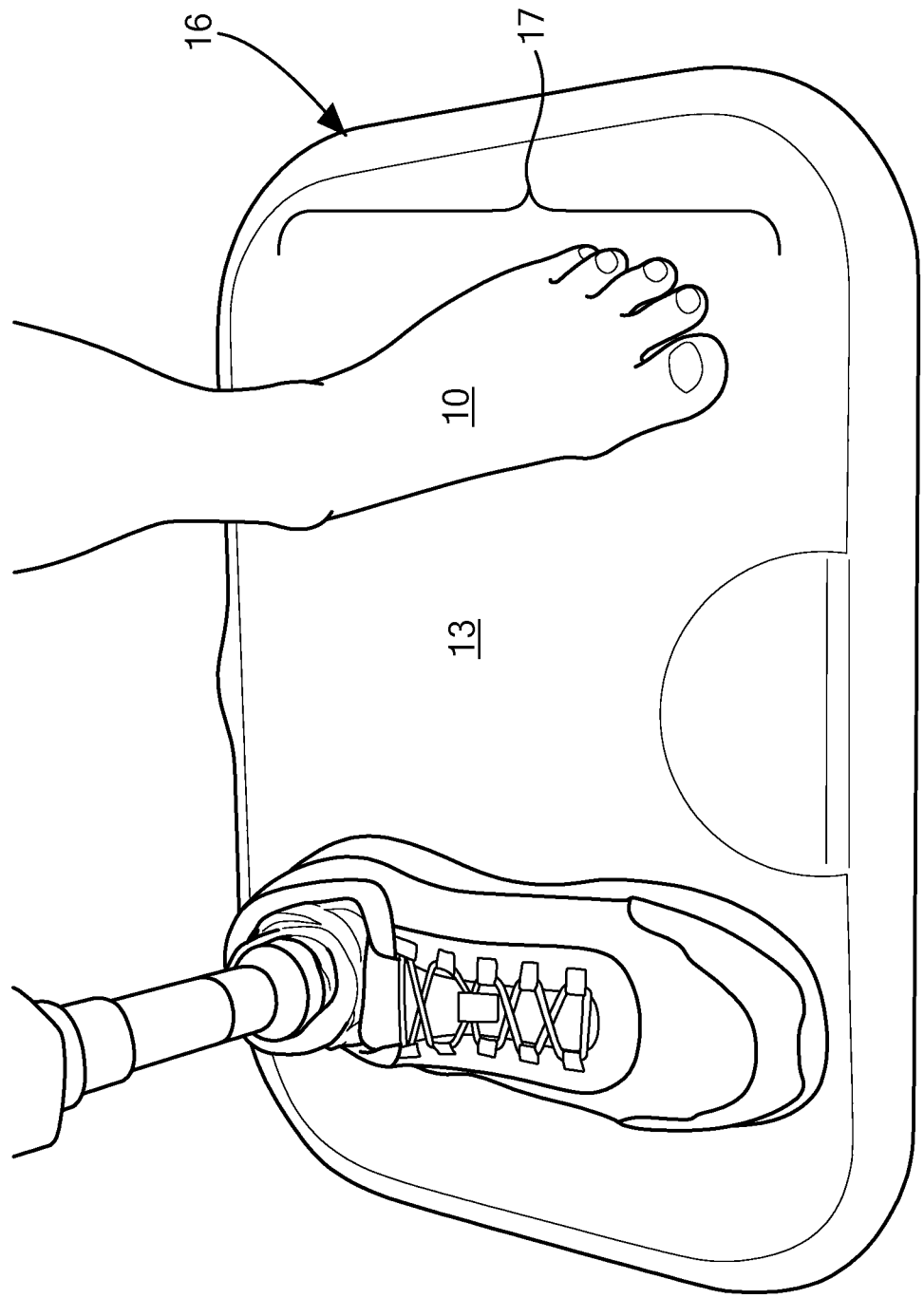
FIG. 2B schematically shows an open platform that may be configured in accordance with illustrative embodiments of the invention. This figure also shows, by example, use by an amputee with a single foot.

FIGS. 2A and 2B schematically show one form factor, in which a patient/user steps on an open platform 16 that gathers data about that user's foot (or feet 10). In this particular example, the open platform 16 has a body in the form of a floor mat placed in a location where he the patient regularly stands, such as in front of a bathroom sink, next to a bed, in front of a shower, on a footrest, or integrated into a mattress. As an open platform 16, the patient simply may step on a receiving region of the top sensing surface of the platform 16 (e.g., using a prosthetic where the other foot would have been, or supported by some object) to initiate the process. Accordingly, this and other form factors often do not require that the patient affirmatively decide to interact with the platform 16. Instead, many expected form factors are configured to be used in areas where the patient frequently stands during the course of their day without a foot covering. Alternatively, the open platform 16 may be moved to directly contact the feet 10 of a patient that cannot stand. For example, if the patient is bedridden, then the platform 16 may be brought into contact with the patient's feet 10 while in bed.

A bathroom mat or rug are but two of a wide variety of different potential form factors. Others may include a platform 16 resembling a scale, a stand, a footrest, a console, a tile built into the floor, or a more portable mechanism that receives at least one of the feet 10. The implementation shown in FIGS. 2A and 2B has a top surface area that is larger than the surface area of one or both of the feet 10 of the patient. This enables a caregiver to obtain a complete view of the patient's entire sole, providing a more complete view of the foot 10.

The open platform 16 also may have some indicia or display 18 on its top surface they can have any of a number of functions. For example, the indicia can turn a different color or sound an alarm after the readings are complete, show the progression of the process, or display results of the process. Of course, the indicia or display 18 can be at any location other than on the top surface of the open platform 16, such as on the side, or a separate component that communicates with the open platform 16. In fact, in addition to, or instead of, using visual or audible indicia, the platform 16 may have other types of indicia, such as tactile indicia/feedback, our thermal indicia.

Rather than using an open platform 16, alternative embodiments may be implemented as a closed platform 16, such as a shoe, shoe insert, insole, or sock that can be regularly worn by a patient, or worn on an as-needed basis. For example, the insole of the patient's shoe or boot may have the functionality for detecting the presence or predicting the emergence of PAD or PDN, and/or monitoring the progression of PAD or PDN. Some embodiments also may have the capability of monitoring for the presence and/or emergence of an ulcer and/or a pre-ulcer.

Figure 3A:
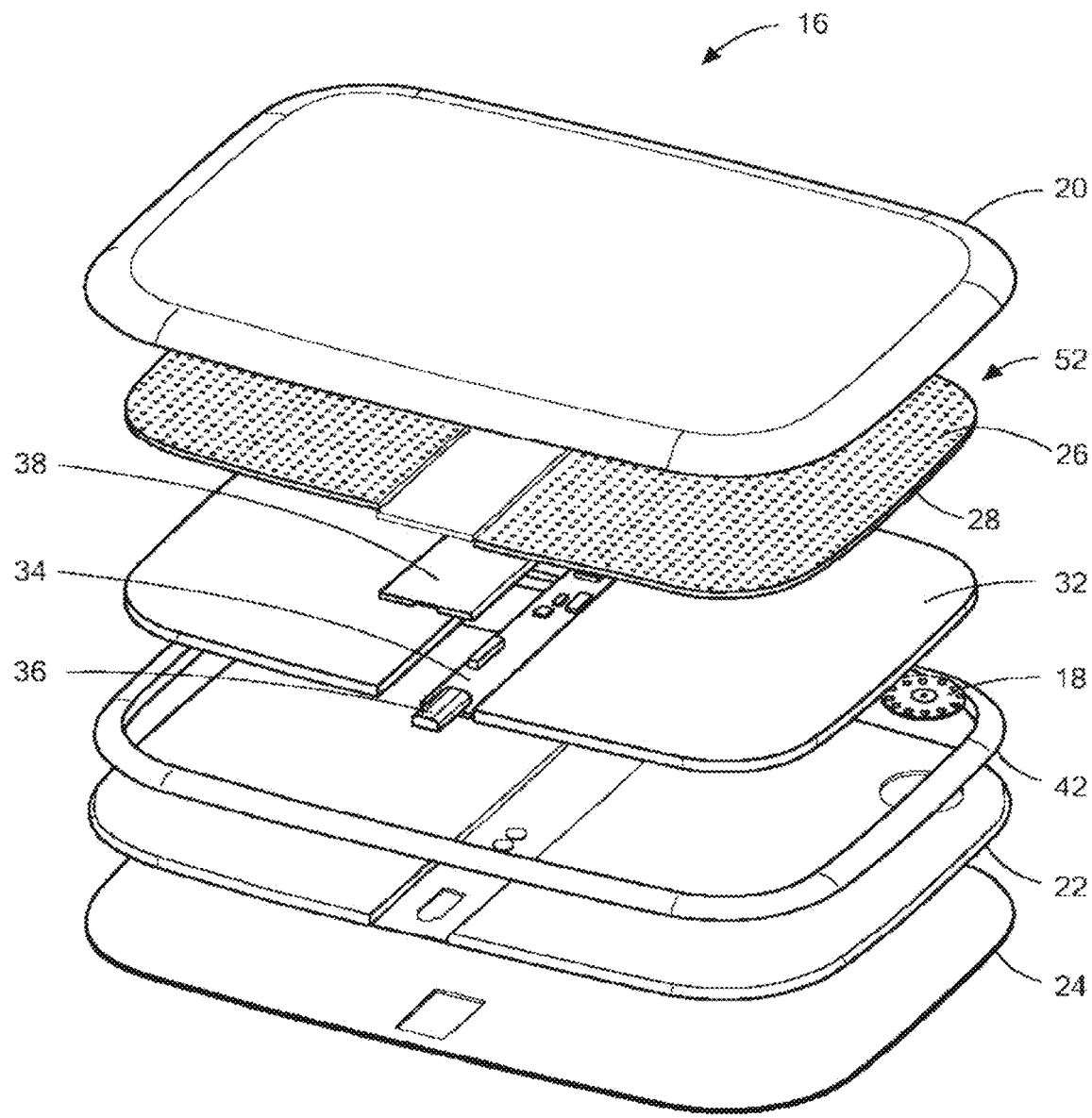
FIG. 3A schematically shows an exploded view of one type of open platform that may be configured in accordance with illustrative embodiments of the invention.

To monitor for complications to the patient's foot (discussed in greater detail below), the platform 16 of FIGS. 2A and 2B gathers temperature data about a plurality of different locations on the sole of the foot 10. This temperature data provides the core information ultimately used to determine the health of the foot 10. FIG. 3A schematically shows an exploded view of the open platform 16 configured and arranged in accordance with one embodiment of the invention. Of course, this embodiment is but one of a number of potential implementation and, like other features, is discussed by example only.

As shown, the platform 16 is formed as a stack of functional layers sandwiched between a cover 20 and a rigid base 22. For safety purposes, the base preferably has rubberized or has other non-skid features on its bottom side. FIG. 3A shows one embodiment of this non-skid feature as a non-skid base 24. The platform 16 preferably has relatively thin profile to avoid tripping the patient and making it easy to use.

To measure foot temperature, the platform 16 has an array or matrix of temperature sensors 26 fixed in place directly underneath the cover 20. These temperature sensors preferably are positioned in a receiving region of the top surface of the platform 16—i.e., a top surface or region of the platform 16 to receive the foot/feet 10. Preferably, the temperature sensors 26 are positioned on a relatively large printed circuit board 28 and communicate directly with the receiving region.

The sensors 26 preferably are laid out in a two-dimensional array/matrix of stationary contact sensors on the printed circuit board 28. The pitch or distance between the preferably is relatively small, thus permitting more temperature sensors 26 on the array. Among other things, the temperature sensors 26 may include temperature sensitive resistors (e.g., printed or discrete components mounted onto the circuit board 28), thermocouples, fiber optic temperature sensors, or a thermochromic film. Accordingly, when used with temperature sensors 26 that require direct contact, illustrative embodiments form the cover 20 with a thin material having a relatively high thermal conductivity. The platform 16 also may use temperature sensors 26 that can still detect temperature through a patient's socks.

Other embodiments may use non-contact temperature sensors 26, such as infrared detectors. Indeed, in that case, the cover 20 may have openings to provide a line of sight from the sensors 26 to the sole of the foot 10. Accordingly, discussion of contact sensors is by example only and not intended to limit various embodiments. As discussed in greater detail below and noted above, regardless of their specific type, the plurality of sensors 26 generate a plurality of corresponding temperature data values for a plurality of portions/spots on the patient's foot 10 to monitor the health of the foot 10.

Some embodiments also may use pressure sensors for various functions, such as to determine the orientation of the feet 10 and/or to automatically begin the measurement process. Among other things, the pressure sensors may include piezoelectric, resistive, capacitive, or fiber-optic pressure sensors. This layer of the platform 16 also may have additional sensor modalities beyond temperature sensors 26 and pressure sensors, such as positioning sensors, GPS sensors, accelerometers, gyroscopes, and others known by those skilled in the art.

Illustrative embodiments performing a thermal analysis of a foot 10 may obtain temperature input values from a variety of sensor types, including thermal cameras, open or closed platforms 16 with contact or non-contact temperature sensors. Some such platforms 16 may include shoes, insoles, bandages, and wraps. Some embodiments may take point temperature measurements by hand. Temperature sensors may include infrared photodiodes, phototransistors, resistive temperature detectors, thermistors, thermocouples, fiber optic, thermochromic sensors. Those skilled in the art will understand that these temperature sensing modalities and sensor types are examples of options available for use, and that some or all of the analysis methods described below are not dependent on the sensor modality employed in the system.

Figure 3B:
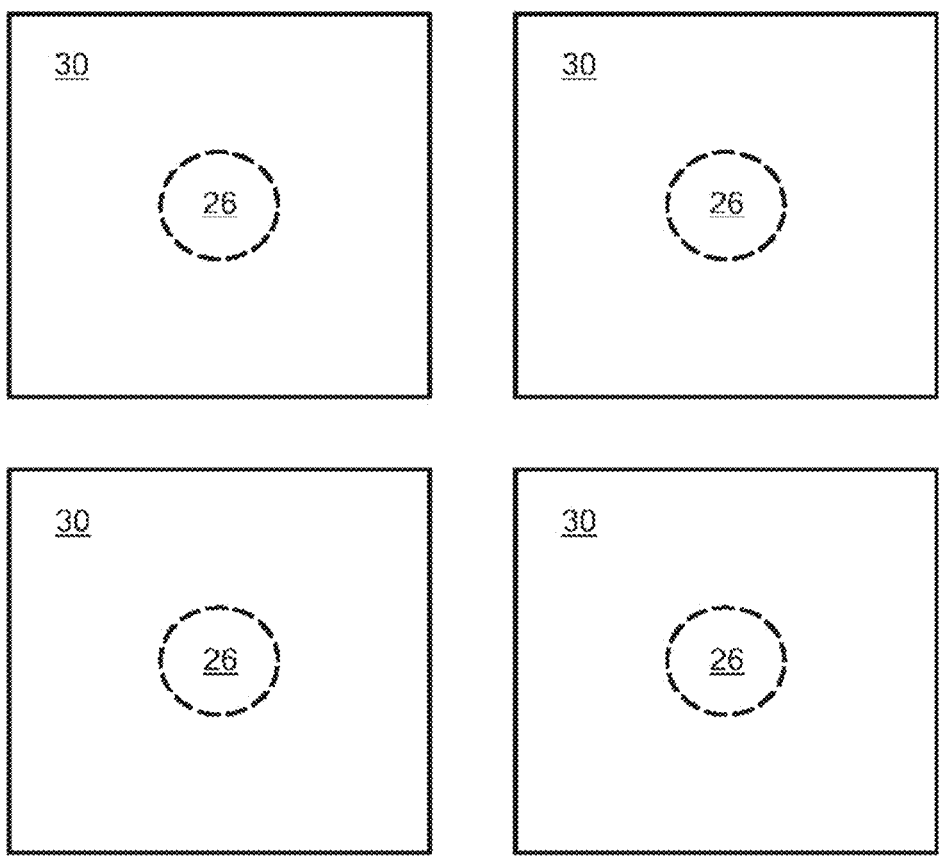
FIG. 3B schematically shows a close-up view of the platform with details of the pads and temperature sensors in the foot receiving region in illustrative embodiments.

To reduce the time required to sense the temperature at specific points, illustrative embodiments position an array of heat conducting pads 30 over the array of temperature sensors 26. To illustrate this, FIG. 3B schematically shows a small portion of the array of temperature sensors 26 showing four temperature sensors 26 and their pads 30. The temperature sensors 26 are drawn in phantom because they preferably are covered by the pads 30. Some embodiments do not cover the sensors 26, however, and simply thermally connect the sensors 26 with the pads 30.

Accordingly, each temperature sensor 26 of this embodiment has an associated heat conducting pad 30 that channels heat from one two-dimensional portion of the foot 10 (considered a two-dimensional area although the foot may have some depth dimensionality) directly to its exposed surface. The array of conducting pads 30 preferably takes up the substantial majority of the total surface area of the printed circuit board 28. The distance between the pads 30 thermally isolates them from one another, thus eliminating thermal short-circuits.

For example, each pad 30 may have a square shape with each side having a length of between about 0.1 and 1.0 inches. The pitch between pads 30 thus is less than that amount. Accordingly, as a further detailed example, some embodiments may space the temperature sensors 26 about 0.4 inches apart with 0.25 inch (per side) square pads 30 oriented so that each sensor 26 is at the center of the square pads 30. This leaves an open region (i.e., a pitch) of about 0.15 inches between the square pads 30. Among other things, the pads 30 may be formed from a film of thermally conductive metal, such as copper.

Alternative embodiments do not require the pads 30.

As suggested above, some embodiments do not use an array of temperature sensors 26. Instead, such embodiments may use a single temperature sensor 26 that can obtain a temperature reading of most or all of the sole. For example, a single sheet of a heat reactive material, such as a thermochromic film (noted above), or similar apparatus should suffice. As known by those in the art, a thermochromic film, based on liquid crystal technology, has internal liquid crystals that reorient to produce an apparent change in color in response to a temperature change, typically above the ambient temperature. Alternatively, one or more individual temperature sensors 26, such as thermocouples or temperature sensor resistors, may be movable to take repeated temperature readings across the bottom of the foot 10.

To operate efficiently, the open platform 16 should be configured so that its top surface contacts substantially the entire sole of the patient's foot 10 in the receiving region. To that end, the platform 16 has a flexible and movable layer of foam 32 or other material that conforms to the user's foot 10. For example, this layer should conform to the arch of the foot 10. Of course, the sensors 26, printed circuit board 28, and cover 20 also should be similarly flexible and yet robust to conform to the foot 10 in a corresponding manner. Accordingly, the printed circuit board 28 preferably is formed largely from a flexible material that supports the circuit. For example, the printed circuit board 28 may be formed primarily from a flex circuit that supports the temperature sensors 26, or it may be formed from strips of material that individually flex when receiving feet. Alternative embodiments may not have such flexibility (e.g., formed from conventional printed circuit board material, such as FR-4) and thus, may produce less effective data.

The rigid base 22 (of the overall body) positioned between the foam 32 and the non-skid base 24 provides rigidity to the overall structure. In addition, the rigid base 22 is contoured to receive a motherboard 34, a battery pack 36, a circuit housing 38, and additional circuit components that provide further functionality. For example, the motherboard 34 may contain integrated circuits and microprocessors that control the functionality of the platform 16.

In addition, the motherboard 34 also may have a user interface/indicia display 18 as discussed above, and a communication interface 40 (FIG. 5) to connect to a larger network 44, such as the Internet. The communication interface 40 may connect wirelessly or through a wired connection with the larger network 44, implementing any of a variety of different data communication protocols, such as Ethernet. Alternatively, the communication interface 40 can communicate through an embedded Bluetooth or other short range wireless radio that communicates with a cellular telephone network 44 (e.g., a 3G or 4G network).

The platform 16 also may have edging 42 and other surface features that improve its aesthetic appearance and feel to the patient. The layers may be secured together using one or more of an adhesive, snaps, nuts, bolts, or other fastening devices.

In another embodiment, the open platform 16 may hold the feet at a prescribed distance from a thermal camera to capture a thermal image of the bottom of the feet. The platform 16 may have an infrared-transparent or translucent window on which the feet are placed. Alternatively, the platform 16 may have an infrared-opaque layer with holes, cutouts, or other discontinuities through which the thermal camera can image the feet.

Some embodiments may use a remote temperature sensing device, such as a thermal camera, without the platform 16. In that case, as discussed below, such embodiments may direct its thermal sensors toward the bottom of the patient's foot/feet 10. For example, the thermal camera may direct its infrared radiation emitter or sensor toward the bottom surface of the patient's foot to produce a current thermal image data set. This thermal image data set may be considered to be analogous to the above noted sets of thermal values discussed above. As such, using a thermal camera in some embodiments may be a useful non-contact way of obtaining the temperature information for monitoring PDN or PAD.

Figure 4:
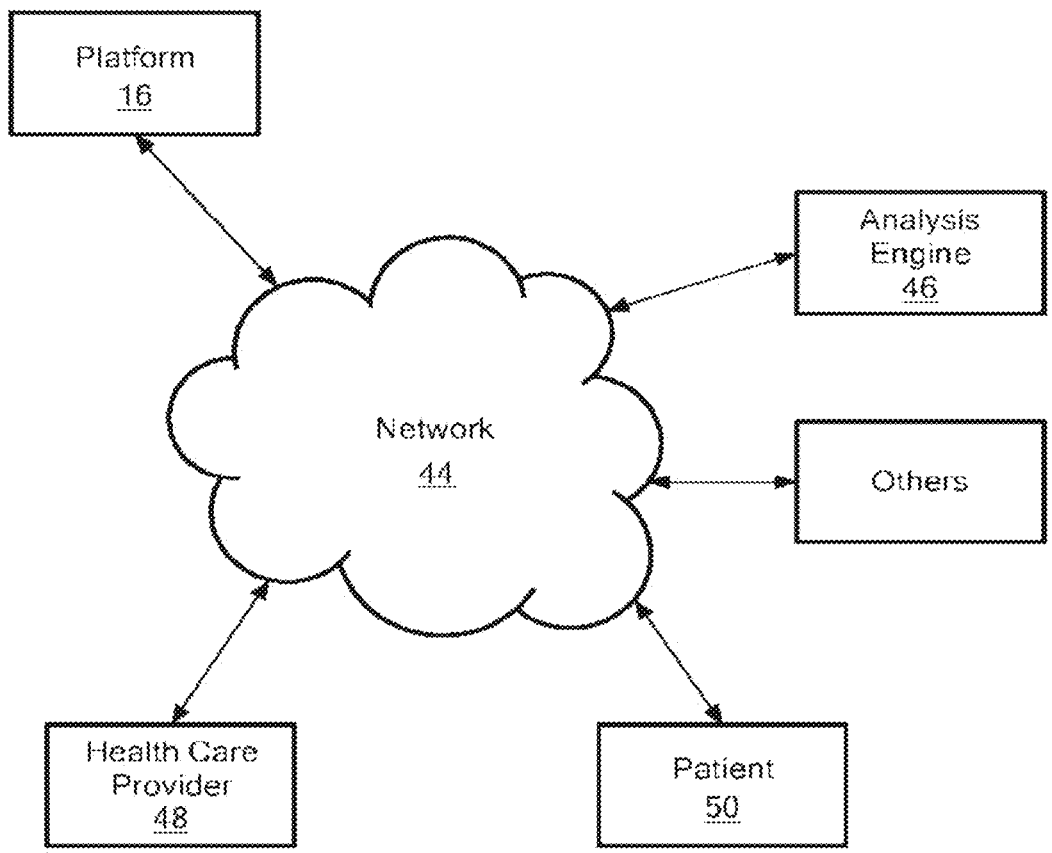
FIG. 4 schematically shows a network implementing illustrative embodiments of the invention.

Although it gathers temperature and other data about the patient's foot, illustrative embodiments may locate additional logic for monitoring foot health at another location. For example, such additional logic may be on a remote computing device. To that and other ends, FIG. 4 schematically shows one way in which the platform 16 can communicate with a larger data network 44 in accordance with various embodiments the invention. As shown, the platform 16 may connect with the Internet through a local router, through its local area network, or directly without an intervening device. This larger data network 44 (e.g., the Internet) can include any of a number of different endpoints that also are interconnected. For example, the platform 16 may communicate with an analysis engine 46 that analyzes the thermal data from the platform 16 and determines the health of the patient's foot 10. The platform 16 also may communicate directly with a healthcare provider 48, such as a doctor, nurse, relative, and/or organization charged with managing the patient's care. In fact, the platform 16 also can communicate with the patient, such as through text message, telephone call, e-mail communication, or other modalities as the system permits.

Figure 5:
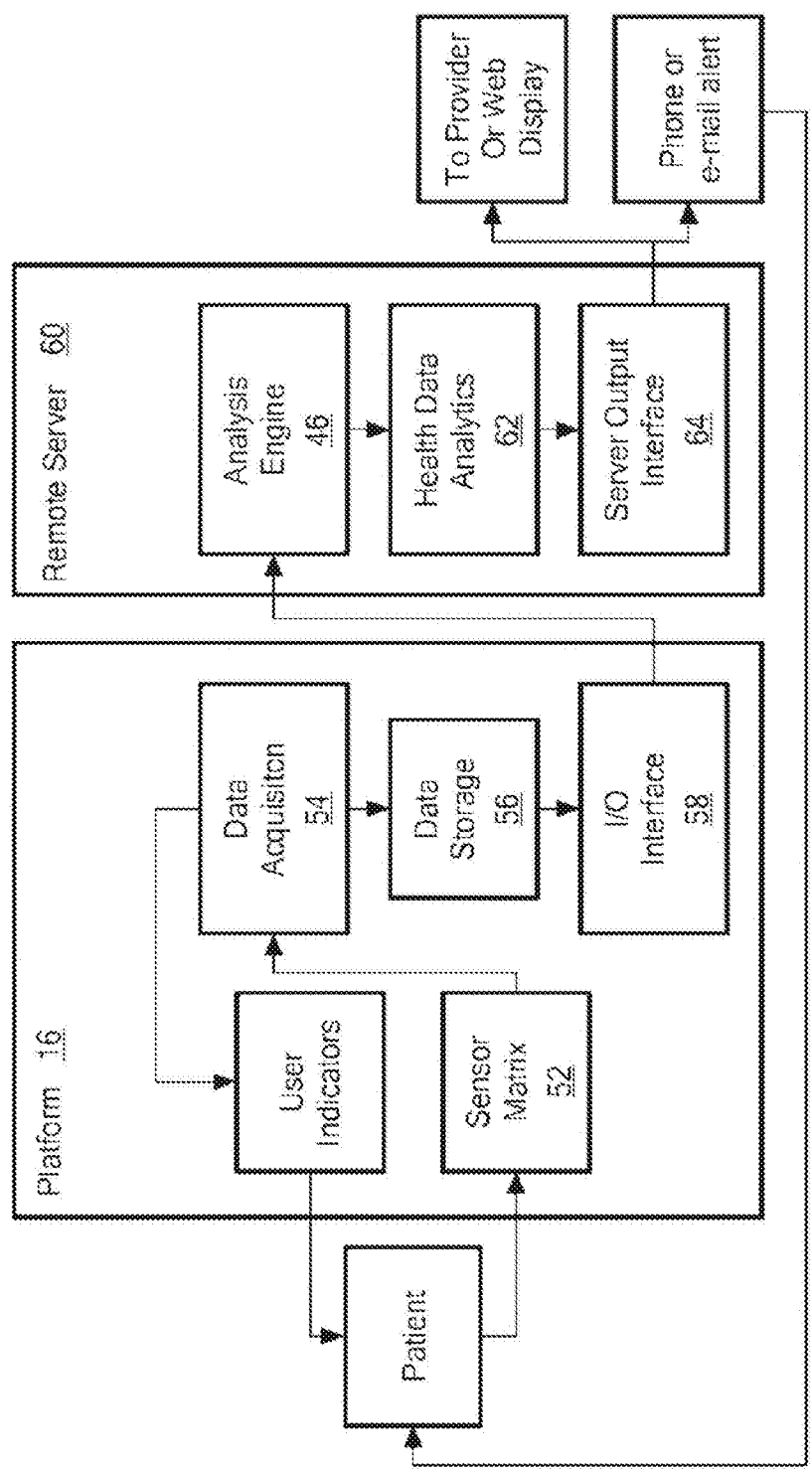
FIG. 5 schematically shows an overview of various components of illustrative embodiments of the invention.

FIG. 5 schematically shows a block diagram of a foot monitoring system, showing the platform 16 (or other modality, such as a thermal camera) in communication with a remote server 60. As shown, the patient communicates with the platform 16 by standing on the receiving region of the body of platform 16, which activates the sensors 26. Alternatively, the foot/feet 10 may be received in some manner by the array of sensors 26 (e.g., array of temperature sensors 26 or, if not on an open or close platform 16, viewable by a thermal camera), which is represented in this figure as a "sensor matrix 52." A data acquisition device 54, implemented by, for example, the motherboard 34 and circuitry shown in FIG. 3A, controls acquisition of the temperature and other data for storage in a data storage device 56. Among other things, the data storage device 56 can be a volatile or nonvolatile storage medium, such as a hard drive, high-speed random-access-memory ("RAM"), or solid-state memory. The input/output interface port 58, also controlled by the motherboard 34 and other electronics on the platform 16, selectively transmits or forwards the acquired data from the storage device to the analysis engine 46 on a remote computing device, such as the noted server 60. The data acquisition device 54 also may control the user indicators/displays 18, which provide feedback to the user through the above mentioned indicia (e.g., audible, visual, or tactile).

The analysis engine 46, on the remote server 60, analyzes the data received from the platform 16 in conjunction with a health data analytics module 62. A server output interface 64 forwards the processed output information/data from the analysis engine 46 and health data analytics module 62 toward others across the network 44, such as to a provider, a web display, or to the user via a phone alert, e-mail alert, text alert, or other similar way.

This output message may have the output information in its relatively raw form for further processing. Alternatively, this output message may have the output information formatted in a high-level manner for easy review by automated logic or a person viewing the data. Among other things, the output message may indicate the actual presence of PAD or PDN, the risk of the emergence of PAD or PDN, the trajectory of PAD or PDN, or simply that the foot 10 is healthy and has no risks of PAD or PDN. In addition, this output message also may have information that helps an end-user or healthcare provider 48 monitor for progression of existing PAD or PDN, and/or begin monitoring the progression of a newly located PAD or PDN.

The output of this analysis can be processed to produce risk summaries and scores that can be displayed to various users to trigger alerts and suggest the need for intervention. Among other things, state estimation models can simulate potential changes in the user's foot 10 and assess the likelihood of complications PAD or PDN in the future. Moreover, these models can be combined with predictive models, such as linear logistic regression models and support vector machines, which can integrate a large volume and variety of current and historical data, including significant patterns discovered during off-line analysis. This may be used to forecast whether the user is likely to develop problems within a given timeframe. The predictions of likelihood can be processed into risk scores, which also can be displayed by both users and other third parties. These scores and displays are discussed in greater detail below.

Using a distributed processing arrangement like that shown in FIG. 5 has a number of benefits. Among other things, it permits the platform 16 to have relatively simple and inexpensive components that are unobtrusive to the patient. Moreover, this permits a "software-as-a-service" business model ("SAAS model"), which, among other things, permits more flexibility in the functionality, typically easier patient monitoring, and more rapid functional updates. In addition, the SAAS model facilitates accumulation of patient data to improve analytic capability.

Some embodiments may distribute and physically position the functional components in a different manner. For example, the platform 16 may have the analysis engine 46 on its local motherboard 34. In fact, some embodiments provide the functionality entirely on the platform 16 and/or within other components in the local vicinity of the platform 16. For example, all of those functional elements (e.g., the analysis engine 46 and other functional elements) may be within the housing formed by the cover 20 and the rigid base 22. Accordingly, discussion of a distributed platform is but one of a number of embodiments that can be adapted for a specific application or use.

Figure 6A:
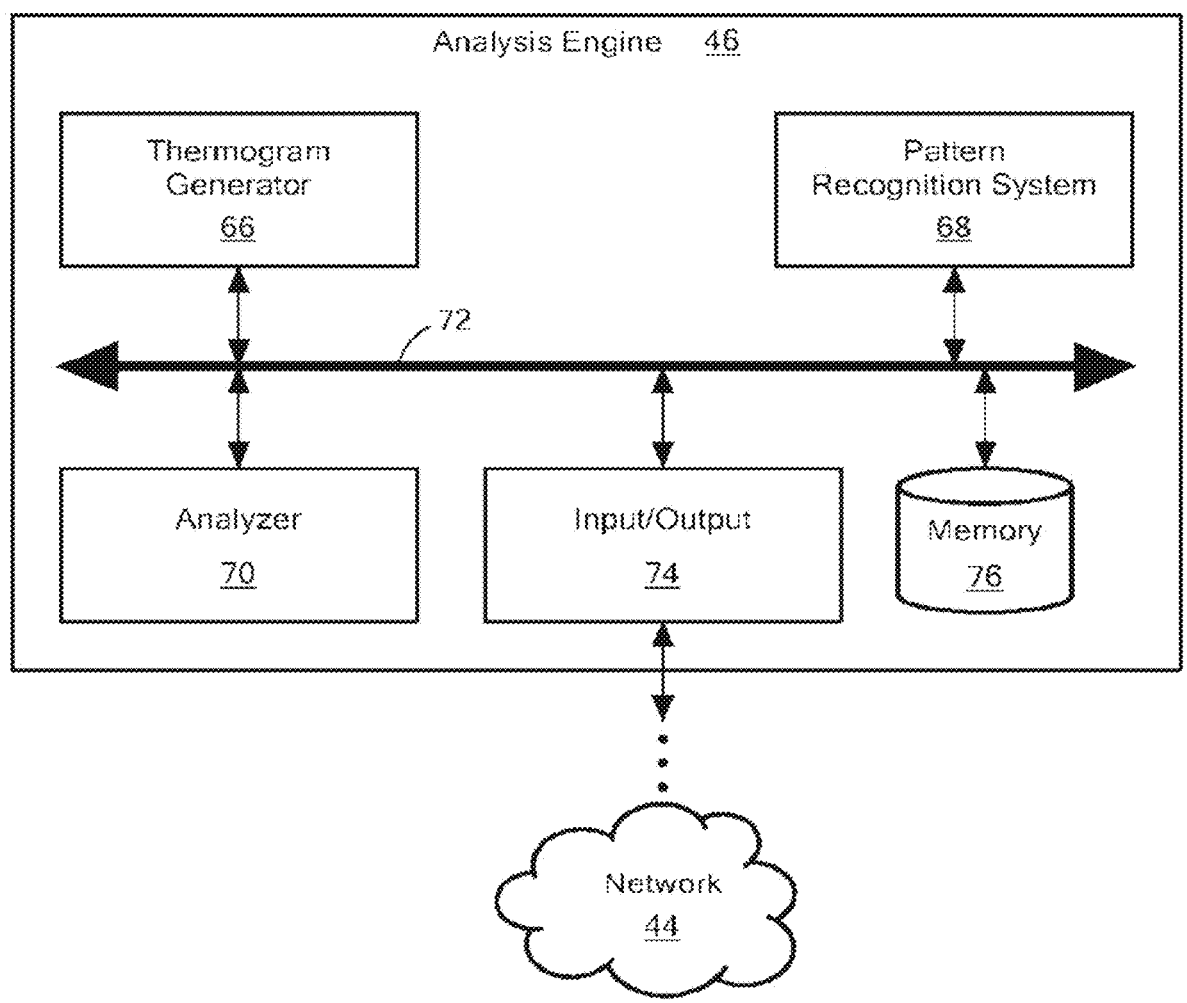
FIG. 6A schematically shows details of a data processing module in accordance with illustrative embodiments of the invention.

Those skilled in the art can perform the functions of the analysis engine 46 using any of a number of different hardware, software, firmware, or other non-known technologies. FIG. 6A shows several functional blocks that, with other functional blocks, may be configured to perform the functions of the analysis engine 46. This figure simply shows the blocks and is illustrative of one way of implementing various embodiments.

In summary, the analysis engine 46 implementation of FIG. 6A has a thermogram generator 66 configured to form a thermogram of the patient's foot or feet 10 (if a thermogram is to be used in the analysis) based on a plurality of temperature readings from the bottom of the foot 10, and a pattern recognition system 68 configured to determine whether the thermogram (if used) and/or if specific temperature readings from the thermal sensors 26 present any of a number of different prescribed patterns. Pattern data and other information may be stored in a local memory 76. If the thermogram and/or the plurality of temperature readings presents any of these prescribed patterns, then the foot 10 may be unhealthy in some manner (e.g., having PAD or PDN) and/or have an undesirable trajectory for PAD or PDN.

The analysis engine 46 also has an analyzer 70 configured to produce the above noted output information, which indicates any of a number of different conditions of the foot 10. For example, the output information may indicate the risk that PAD or PDN will emerge, the existence of previously undiagnosed PAD or PDN, or the progression of a known PAD or PDN. Communicating through some interconnect mechanism, such as a bus 72 or network connection, these modules cooperate to determine the status of the foot 10, which may be transmitted or forwarded through an input/output port 74 that communicates with the prior noted parties across the larger data network 44.

Figure 6B:
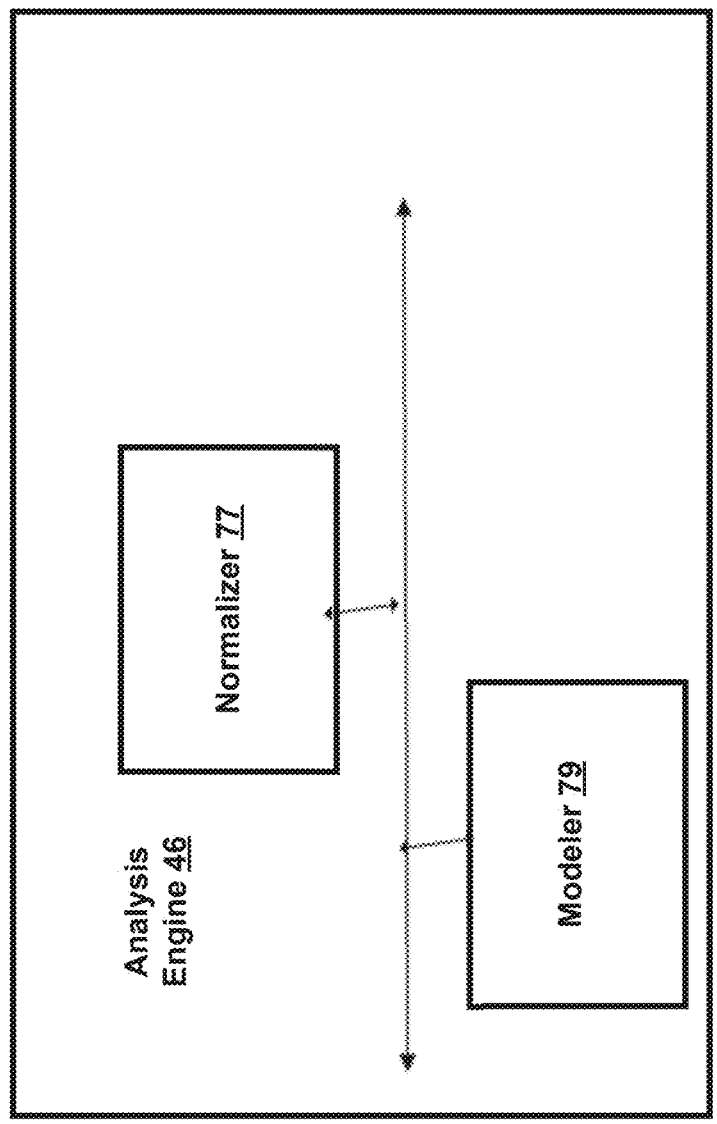
FIG. 6B schematically shows details of additional functionality of a data processing module in accordance with illustrative embodiments of the invention.

FIG. 6B schematically shows additional components that may be part of the analysis engine 46. These components may be used in conjunction with the prior noted components of FIG. 6A. Specifically, the analysis engine 46 also has a normalizer 77 configured to set a normalization reference to a plurality of sets of temperature data value and thus, produce normalized data. As discussed in detail below, in preferred embodiments, a normalization reference acts as a way to normalize the temperature data values against a common reference, such as the ambient temperature (e.g., the environmental temperature), or the temperature of the same spot on the other foot. The normalizer 77 is operatively coupled, via the bus 72 (or other interconnect apparatus) to a modeler 79. In preferred embodiments, the modeler 79 is configured to transform the normalized data, from the normalizer 77, into model information representing the progression of PDN or PAD. This model information essentially characterizes a plurality of normalized temperature data points (in this case, normalized temperature data values) into a simpler system. In other words, the normalized temperature data points are a more complex system, and the modeler 79 transforms this data into a simpler system that can be more accurately and easily characterized (as discussed below).

Figure 7:
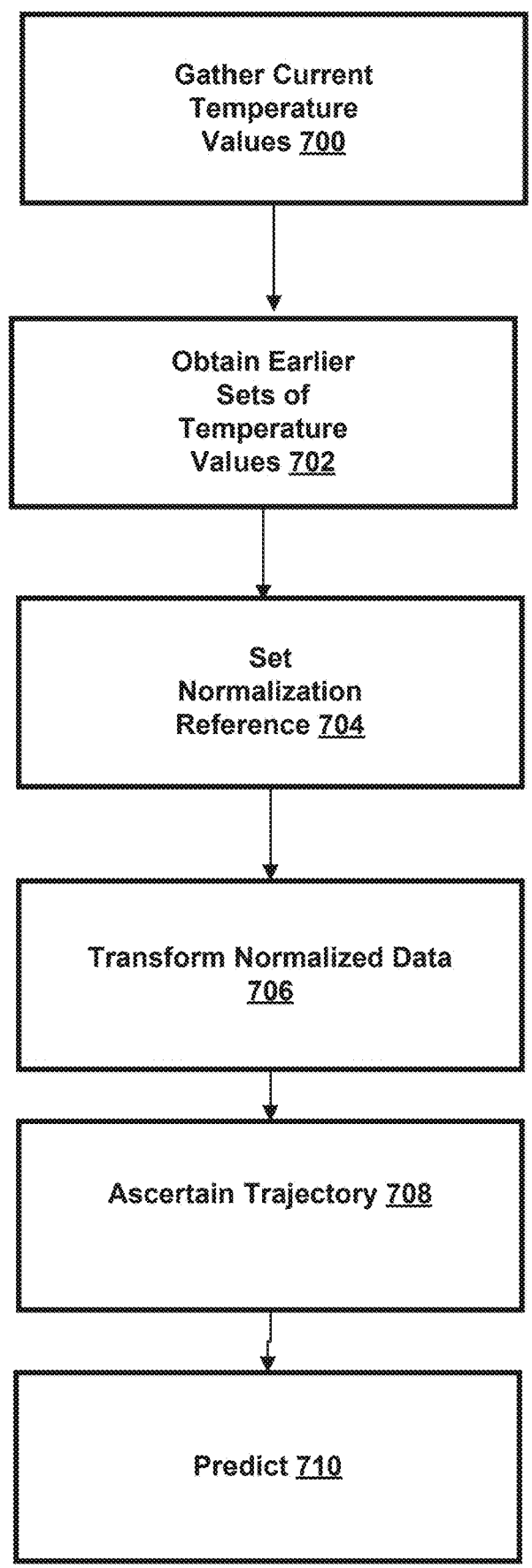
FIG. 7 shows a process of monitoring a patient's foot/feet in accordance with illustrative embodiments of the invention.

FIG. 7 shows a process of monitoring the patient's foot/feet 10 in accordance with illustrative embodiments of the invention. It should be noted that this process is simplified from a longer process that normally likely would be used to monitor the patient's foot/feet 10. Accordingly, the process of FIG. 7 has additional steps that those skilled in the art likely would use. In addition, some of the steps may be performed in a different order than that shown, or at the same time. Those skilled in the art therefore can modify the process as appropriate.

The process of FIG. 7 begins at step 700, which gathers current temperature values of the patient's foot 10. For example, if using a platform 16, the user may step upon the receiving region, thus contacting the bottom surface of their foot/feet 10 and communicating with the set of (one, two, or more) temperature sensors 26. The platform 16 may automatically detect this contact (e.g., using a pressure or other sensor), or require some input, such as a button that, when actuated, effectively causes the set of temperature sensors 26 to produce a set of temperature values. Since these temperature values are obtained most recently or "currently," such set is referred to as a "current set of temperature values" or the like. Each temperature value in the set is indicative of a discrete temperature measurement of a specific temperature sensor (or region of a single temperature sensor).

Concurrently, before or after producing the current set of temperature values, at step 702, the input/output 74 receives a plurality of earlier sets of temperature values produced at earlier times. Each earlier set may be retrieved memory 76 or other location and have been obtained (and stored) at an earlier time. For example, the earlier sets of temperature values may include five separate sets that each are produced by the modality (e.g., the platform 16) from the patient's foot 10 consecutive days (e.g., each set being obtained a day apart).

Accordingly, within a single week, the first earlier set may have been produced on Monday, the second set on Tuesday, the third set on Wednesday, the fourth set on Thursday, and the fifth set on Friday. Other embodiments may produce the different sets at different spaced apart intervals, such as more than one day (e.g., every two or three days), weekly, monthly, etc. The intervals also may be irregular, such as one set on Monday, the next set on Tuesday, the third set on Friday, the fourth set on Saturday, and the fifth set on Sunday. The clinician may configure the system to the desired intervals as appropriate.

If used together as described, each temperature value in each set (the preferably has correspondingly located temperature values in the other sets. For example, if the sensors 26 has a single sensor that gathers a temperature value the bottom of the big toe, then each set has a temperature value for the big toe. The key difference between sets is that each temperature value is temporally spaced from other corresponding/like positioned temperature values.

The inventors discovered that as little as four earlier sets of temperature values may, in many instances, suffice to provide the appropriate information for the noted purposes. While four earlier sets of temperature values are discussed, however, those skilled in the art may select an appropriate number of earlier sets for the given application. For example, some embodiments may use dozens of earlier sets (e.g., 95), hundreds (e.g., 990), or thousands of earlier sets (e.g., 9950, 10,000, or more), of temperature values, or any number of sets between four and those exemplary numbers.

Some embodiments may use more data than that of the specific points of the temperature sensors 26. In that case, the thermogram generator 66 may use a thermogram to determine the temperature(s) at one or more other portions of the patient's foot 10 to obtain the geographic temperature data of interest. Accordingly, if the patient is not appropriately positioned on the platform 16 or otherwise the exact locations are not accessible by the modality obtaining the temperature values, the thermogram generator 66 may adjust the data and produce an accurate assumption of the temperature value. As noted in the incorporated patent, such non-directly obtained temperature values may be obtained using interpolation and similar techniques.

Next, at step 704, the normalizer 77 sets a normalization reference for the current and earlier sets of temperature values. As noted above, in preferred embodiments, a normalization reference normalizes the temperature data values against a common reference to form normalized data. Each set of temperature values preferably is normalized using the same normalization reference(s). In illustrative embodiments, the normalizer 77 provides the normalization reference function and, consequently, normalizes the sets of temperature values using one or combinations of one or more methods/techniques. Each of these techniques preferably is applied to all of the sets of temperature values under analysis. Moreover, each of these techniques can be used as part of a mathematical function or algorithm for normalizing the temperature values.

Exemplary Normalization Reference Method 1: Comparison Between Contralateral Locations The temperatures at any location on one foot 10 may be compared with any location on the other foot 10. For example, because of anatomical symmetry, the temperature on the hallux of the left foot 10 may be a good reference point for comparison against temperature from the hallux on the right foot 10. In cases where PAD or PDN affects one limb more than the contralateral limb, a difference in temperature between the two locations may increase over time as the disease progresses. This may be a slow trend over time due to disease progression, or it may be acute as in the formation of a clot.

Embodiment A: Anatomically-matched. Measure the temperature at one location on one foot 10 and the temperature at the same location on the other foot 10, and calculate the absolute value of the difference between the two locations, and compare the difference to a predetermined threshold (e.g., two degrees C.) to determine if the temperature pattern is indicative of some complication.

Embodiment B: Anatomically different. Measure the temperature at one location on one foot 10 and the temperature at a different location on the other foot 10, and calculate the absolute value of the difference between the two locations. Next, compare the difference to a predetermined threshold (e.g., two degrees C.) to determine if the temperature pattern is indicative of some complication. This embodiment enables use by patients with prior amputation who may be missing anatomy to enable anatomically-matched contralateral comparison of temperatures. In this case, an area proximal to the amputated anatomy may be used. For example, if a patient has had a right hallux amputated, but retains a left hallux, the temperature of the left hallux may be compared to the temperature at the ball of the foot 10.

Exemplary Normalization Reference Method 2: Comparison Between Ipsilateral Locations The temperatures at any location on the foot 10 may be compared with another location on the same foot 10. For example, the heel may serve as a stable reference point due to its relative temperature stability over time compared to more distal portions of the foot 10. In response to changes in environmental temperatures, distal portions of the feet may not be able to thermoregulate as effectively as proximal portions, resulting in a greater temperature difference.

Embodiment A: Absolute value above a certain threshold. Measure the temperature at two locations, calculate the absolute value of the difference between the two locations, and compare the difference to a predetermined threshold (e.g., two degrees C.) to determine if the temperature pattern is indicative of some complication.

Embodiment B: Asymmetric threshold. Measure the temperature at two locations on the foot 10. Subtract the temperature at location 1 from the temperature at location 2 and compare it to a threshold A. Then subtract the temperature at location 2 from that of location 1 and compare it to a threshold B where threshold A is different from threshold B. Then determine if either of the differences exceed the two different predetermined thresholds. This embodiment enables detection of complication that result in an abnormally warm region as well as complication that may result in an abnormally cool region.

Embodiment C: Unique thresholds for different locations. Measure the temperature at three locations on the foot 10. Subtract the temperature at location 1 from that at location 2 and compare it to threshold A. Then subtract the temperature at location 3 from that of location 2 and compare it to threshold B. Then determine if either of the differences exceed the two different predetermined thresholds. This embodiment optimizes accuracy for various anatomical locations. For example, the toes may require a higher threshold than the heel because of the greater temperature variation at more distal regions of the foot 10.

Exemplary Normalization Reference Method 3: Comparison of Locations to a Statistic Individual locations may be compared to a statistic that summarizes the temperatures over the whole foot 10 instead of relying on a single location for comparison, which may present with unstable temperature patterns over time. In cases where the whole foot 10 may be affected by PAD or PDN, such as broad inflammation, the temperature of the whole foot 10 may change over time. Alternatively, if the location of vascular compromise is not already known, a method in which the minimum and/or maximum temperature location is identified is highly sensitive for identifying changes to the health of the foot 10.

Embodiment A: Comparison to a central tendency statistic (such as the mean or median). Measure the temperature over a plurality of discrete locations or over a continuous portion of the foot 10 and calculate the mean or median temperature. Measure the temperature of another location either within the region of the average or outside of it. Then subtract the average from the temperature in the location of interest and compare it to a threshold.

Embodiment B: Comparison to the minimum. Calculate the minimum temperature among a set of discrete temperature values or from within a continuous portion of the foot 10. If using a continuous portion of the foot 10, the region may exclude the data within a certain margin from the edges of the foot 10. Measure the temperature of another location either within the region of the average or outside of it. Then subtract the minimum from the temperature in the location of interest and compare it to a threshold.

Embodiment C: Comparison to a percentile. Similar to Embodiment B, except instead of calculating the minimum temperature value for comparison, calculate a predetermined percentile, such as the 10th percentile. This approach avoids extremes in the distribution of temperature at the low or the high side, which may result in inaccurate analyses.

Embodiment D: Comparison with a statistical distribution. Compute a statistical distribution of the temperatures among a set of discrete temperature values or from within a continuous portion of the foot 10. Measure the temperature of another location either within the region of the average or outside of it. Then determine if the location of interest is within the distribution using common statistical methods.

Exemplary Normalization Reference Method 4: Comparison of a Temperature Range to a Threshold The range of a set of foot temperature data captures both abnormally warm locations and abnormally cool locations and conveniently presents it as a single statistic that can be easily compared to a threshold. In a healthy foot 10 with normal blood flow, the whole foot 10 is expected to be well-vascularized and fed with warm, oxygenated blood, resulting in generally uniform temperature distributions, i.e. a low range of temperatures. In a foot 10 affected by PAD or PDN, however, portions of the foot 10 likely will appear significantly warmer than other portions.

Embodiment A: Range of discrete temperature locations. Measure the temperature of a plurality of discrete temperature locations on the foot 10. Calculate the range of temperatures within the set and compare the range to a predetermined threshold to determine if the temperature pattern is indicative of some complication.

Embodiment B: Range of continuous temperature data. Measure the temperature of a continuous region on the foot 10. If necessary, exclude the data within a margin from the edges of the foot 10. Calculate the range of temperatures within the region and compare the range to a predetermined threshold to determine if the temperature pattern is indicative of some complication.

Exemplary Normalization Reference Method 5: Change Over Time

In some instances, the absolute temperature at a given time is not as informative as the change in temperatures over time. Chronic conditions may present as slow changes over a long time and acute conditions may present as fast onset or short-lived patterns. Changes in the temperatures of the feet over short or long durations indicate progression of PAD or PDN.

Embodiment A: Simple threshold above a baseline. Measure and store the foot temperature at a baseline time reference. Then, for a later time t, measure the foot temperature again. Compare the temperatures at time t with the temperatures at baseline and determine if any location has changed in temperature from the baseline more than a predetermined threshold. Alternatively, measure the difference in temperatures between locations on the foot 10 and compare the spatial differences with the baseline spatial differences. This method has the advantage of personalizing the analysis to an individual's idiosyncratic foot temperature patterns. However, it assumes that the baseline temperatures are a healthy reference location, which may not be true for individuals healing from a recent wound or with other active complications.

Embodiment B: Moving average baseline. In a related embodiment, the baseline temperatures may be calculated as a moving average or a filtered resultant from a time series of multiple sets of temperature data from various locations in time. The average may be taken from a small number of samples to optimize for detecting acute changes in foot temperatures or from a large number of samples to optimize for detecting subtle changes or chronic conditions.

Embodiment C: Integral of temperature change over time. In yet another embodiment, the foot temperatures may be compared to a baseline reference or a static threshold for each set of data values in a time series of samples. These comparisons may then be summed, integrated, or otherwise aggregated to generate a summary statistic for the change over time. This approach has an advantage of emphasizing persistent changes over time while filtering out noisy or inconsistent temperature fluctuations.

Exemplary Normalization Reference Method 6: Comparison with Ambient

Comparing foot temperature with ambient temperature (i.e., an ambient temperature value) provides an opportunity to detect complications PAD or PDN in the foot 10 in cases where there may be no spatial variation within the foot 10. As discussed above, a foot 10 affected by PAD or PDN is less able to thermoregulate than a healthy limb, resulting in lower differences between the feet and ambient temperature in cold environments. Alternatively, systemic inflammation due to PDN may cause a greater difference between the foot 10 and ambient temperature.

Embodiment A: Compare a central tendency statistic of temperature values to ambient temperature. Measure the ambient temperature using either a background signal from the temperature sensor (e.g. the background of a thermal camera image or non-foot region from a 2D temperature scan) or from a separate temperature sensor that is not measuring foot temperature. Measure the temperature across the foot 10 and calculate a central tendency statistic (e.g. mean, median, mode). Compare the central tendency statistic to ambient temperature and determine if the difference exceeds a predetermined threshold.

Embodiment B: Compare a specific location to ambient. In a related embodiment, measure ambient temperature, and then measure the foot temperature at a specific location or region on the foot 10. Compare the temperature at that location to ambient temperature and determine if the difference exceeds a predetermined threshold. This embodiment has a benefit of allowing the clinician or researcher to select a consistent location on the foot 10 with relatively stable temperatures that is not as susceptible to environmental or other temporary perturbations as other locations.

Embodiment C: Compare the maximum to ambient. In another related embodiment, measure ambient temperature, and then measure the foot temperatures over the whole foot 10 and calculate the maximum temperature of the foot 10. Compare the maximum to ambient temperature and determine if the difference exceeds a predetermined threshold. This embodiment is expected to provide good sensitivity in cases where the warmest portion of the foot 10 may move from scan to scan.

Exemplary Normalization Reference Method 7: Comparison with Body Temperature

This method is similar to Exemplary Normalization Reference Method 5, but less susceptible to intermittent or irregular fluctuations in ambient temperature due to changing environmental conditions. Comparing foot temperature with body temperature may provide a more accurate basis for detecting complication by accounting for external variables that affect foot temperature.

Embodiment A: Comparing to internal body temperature. Measure internal body temperature either at the core or preferably at the limb closest to the surface measurement location. Then compare the surface foot temperature measurements to the internal body temperature and determine if the difference exceeds a predetermined threshold.

Embodiment B: limb surface temperature. Measure the surface temperature of the limb preferably close to the foot measurement location (e.g., ankle or leg). Then compare the surface foot temperature measurements to the surface limb temperature and determine if the difference exceeds a predetermined threshold. Acquisition may be easier with this embodiment (vs. internal body temperature) as surface temperature sensors 26 may be adhered to the skin to collect surface temperature. This approach has the added benefit of limiting the effects of ambient temperature, physical activity, and vascularity, which typically would affect the limb as well as the foot 10.

Exemplary Normalization Reference Method 8: Isothermal Area

The size of a region of elevated temperature may be more informative than the specific temperature of that region for certain complications, such as monitoring wound healing.

Embodiment A: Comparing an isothermal area. Choose a comparison from any of the exemplary normalization reference methods described above and calculate the difference between each location in the foot temperature data set and the comparison value. Then determine which locations, pixels, or regions are above a predetermined threshold. Calculate the area of the region that exceeds that threshold in number of points, pixels, or area (e.g. cm2). Determine if the area of elevated temperature exceeds a predetermined threshold.

Embodiment B: Monitoring isothermal area over time. Similar to Exemplary Normalization Reference Method 7, Embodiment A except that the determination is made as to whether the isothermal area has changed in size over time.

By themselves, Exemplary Normalization Reference Methods 1-8 may detect one distinct type of complication of diabetes mellitus in the foot 10 and can be optimized to detect that complication with a high degree of sensitivity and specificity. However, just using one method may not generalize to other types of complications. Accordingly, illustrative embodiments may combine two or more of Exemplary Normalization Reference Methods 1-8, or use them individually. For example, two or more of those methods may be combined with simple logical terms or in linear combinations to provide a more accurate prediction. For example, some embodiments combine two of the methods, three of the methods, four of the methods, five of the methods, six of the methods, seven of the methods, or one or more of the methods with another method not discussed.

In one embodiment, two or more of the above noted methods are combined with OR statements. For example, if Exemplary Normalization Reference Method 1 is true OR Exemplary Normalization Reference Method 2 is true, then the probability of complication is high. This combination has the benefit of allowing specialization of the methods to detect certain types of complications and naturally increases the sensitivity of the detection system across multiple complications. In another embodiment, methods may be combined with AND statements. For example, if Exemplary Normalization Reference Method 1 is true AND Exemplary Normalization Reference Method 2 is true, then the probability of complication is high. This combination thus may create a highly specific detection method.

In another embodiment, methods may be combined as a linear combination of continuous or categorical outputs. For example, if two methods are combined, each which produce a continuous variable output, such as degrees C., the combined formulation may multiply each method variable by a coefficient to obtain a final result which may then be used to determine the probability of a complication PAD or PDN. In this embodiment, the formulation may be in the form $R=A*M1+B*M2$ where R is risk, M1 and M2 are Exemplary Normalization Reference Method 1 and Exemplary Normalization Reference Method 2 variables, and A and B are coefficients. This combination technique has the added benefit of weighting the variables unevenly, depending on which is more influential on the complication the researcher is interested in. Additionally it is optimizable across all of the independent input variables simultaneously to obtain a system which maximizes sensitivity and/or specificity depending on the aims of the researcher.

One skilled in the art will recognize that the optimization of thresholds may be done on a per-method basis or for a set of methods in whatever combinations are used to optimize the sensitivity and specificity of the combined set of methods.

Additionally, instead of applying simple thresholding (either for a single set of foot temperature measurements at one time or for multiple sets of temperature values) to identify risk, the magnitude of any of the metrics given in Exemplary Normalization Reference Methods 1-8 can also be informative of risk. For example, a large difference in the temperature difference described in Exemplary Normalization Reference Method 1 may indicate higher risk than a lower magnitude temperature difference.

Those skilled in the art will recognize that temperatures from certain regions of the feet 10 may be more informative for identifying the presence or progression of complications of diabetes mellitus, such as PAD or PDN. For example, because both are progressive diseases that begin in the most distal parts of the anatomy of the foot 10, such as the toes, temperatures in the toes may be more important for prediction, identification, and monitoring the progression of PAD or PDN. As another example, the inventors were surprised to discover that use of their open platform apparatus more clearly demonstrated that temperatures in the medial midfoot or arch of the foot 10 are disproportionately predictive of the presence of PDN, possibly due to vasodilation of the medial plantar artery which branches in the foot 10 near the arch of the foot 10. Illustrative embodiments use specific technology to more easily access the data from this discovery. In some embodiments, large differences when comparing the temperature at one or more of the toes with ambient, and/or comparing the temperature at the midfoot to ambient may suggest a problem.

Accordingly, after setting the normalization reference, the process continues to step 706, in which the modeler 79 transforms the normalized data as described above with regard to the exemplary normalization reference methods into model information in compliance with one or more models. The models represent the progression of PDN or PAD. In various embodiments, this transformation to the model generally mitigates or eliminates noise in the temperature values to produce more accurate determinations of the trajectory of PDN or PAD. FIGS. 8B-8D graphically show normalized data and simple models respectively using normalization references noted above relating to ambient, contralateral, and ipsilateral references (Exemplary Normalization Reference methods 6, 1, and 2 respectively). FIG. 8A shows a model using the temperature values without normalization. In these cases, the dots represent the normalized data of a given geography over time. The modeler 79 produces the straight line as a model that, as noted above, simplifies the trends and details of the dots representing the normalized data. Indeed, a straight line is a simple example for illustrative purposes only. Those skilled in the art may apply other models, as discussed below.

Next, at step 708, the modeler 79 ascertains the trajectory of the patient's PDN or PAD using the model information. Among other things, the trajectory may include one or both of the rate of change of the model information, and the magnitude of the model information. Determination of this trajectory enables the modeler 79, which may have a predictor (not shown), to predict the future status of PDN or PAD for the patient relative to the current set of temperature values (strep 710).

Some embodiments may conduct simple statistical evaluations to determine if any of the methods and values enumerated above demonstrate a trajectory indicating that PAD or PDN is trending upward or downward over time. These trends and the magnitude of the trend over a predetermined time horizon may indicate whether the PAD or PDN is progressing, stable, or resolving.

Other embodiments may use machine learning and advanced filtering techniques to ascertain risks and predictions related to the presence or progression of PD 12 or PDN using the normalized data and consequent model information as discussed above. More specifically, advanced statistical models may be applied to estimate the current status and health of the patient's feet 10, and to make predictions about future changes in foot health. State estimation models, such as a switching Kalman filters, can process model information and related data as they become available and update their estimate of the current status of the user's feet 10 in real-time. The statistical models can combine both expert knowledge based on clinical experience, and published research (e.g., specifying which variables and factors should be included in the models) with real data gathered and analyzed from users. This permits models to be trained and optimized based on a variety of performance measures.

Models can be continually improved as additional data is gathered, and updated to reflect state-of-the-art clinical research. The models also can be designed to consider a variety of potentially confounding factors, such as physical activity (e.g., running), environmental conditions (e.g., a cold floor), personal baselines, past injuries, predisposition to developing problems, and other known complications. In addition to using these models for delivering real-time analysis of users, they also may be used off-line to detect significant patterns in large archives of historical data.

Exemplary Reference Methods 9 through 10 may extend Exemplary Normalization Reference Methods 1-8 and, illustratively, primarily or exclusively relate to modelling (discussed above). For example, Methods 9 and 10 may make use of the prior noted Methods 1-8 during the modelling process.

Exemplary Method 9: Statistical Inference

The foot temperature data from a patient, processed with one or more of the Exemplary Normalization Reference Methods 1-8, can be used to predict the future development of PAD or PDN using one of several statistical inference models.

Embodiment A: ARMA (autoregressive moving average) or ARIMA (autoregressive integrated moving average) models. A statistical regression model of the trends in the temperature data from a patient can be used to predict future values of those temperature data, which can be used to determine future presence of PAD or PDN. Such a model can be used to predict future temperature data using only previous data from the same patient. One benefit of this approach is that it can handle forecasting non-stationary processes, such as temperature evidence of a progressive foot disease that is non-stationary. Another benefit is that it can handle seasonal and other cyclic fluctuations.

Embodiment B: Kalman filtering. Similarly, a Kalman filter can be fit to the normalized data from the patient and/or the temperature values themselves in the various sets, and can be used to predict future values of those temperature data. Using this method, Kalman filtering may be used to determine future presence of PAD or PDN. This embodiment is related to Embodiment A of Exemplary Method 10 below with the assumption that all variables follow a Gaussian distribution. There are benefits to using a Kalman filter to predict and estimate PAD or PDN relative to Embodiment A of Exemplary Method 10, including improved computational efficiency and stability.

Exemplary Method 10: Anomaly Detection

The foot temperature data from a patient, processed with one or more of the approaches detailed in Exemplary Normalization Reference Methods 1-8, can be used to monitor the progression of PAD or PDN using one of several anomaly detection approaches.

Embodiment A: Unsupervised detection. One or more unsupervised anomaly detection methods may be applied to the foot temperature data from a patient. For example, a density-based technique such as clustering and cluster membership testing may be applied to the foot temperature data to determine whether a trend in foot temperature is indicative of the progression of PAD or PDN. More sophisticated unsupervised detection detections, such as a hidden Markov model, may also be used to determine whether a trend in foot temperature exists indicating progression of PAD or PDN. Those skilled in the art should recognize that there is no requirement, in this embodiment, to train data to build the model for ascertaining whether PAD or PDN is progressing.

Embodiment B: Supervised detection. If training data is available, a supervised anomaly detection technique may be utilized. In this case, the foot temperature data from patients, with and without a complication of diabetes mellitus PAD or PDN, are used to build a classification model, and subsequent evaluations of the model are performed when additional foot temperature data is acquired in order to determine whether PAD or PDN is progressing. Alternatively, foot temperature data from patients who have exhibited progression of complications of DM may be used to build a classification model. A simple model may compare the foot temperature data over time from new patients to the foot temperature data over time from patients with known progression or absence of progression of PAD or PDN. A nearest-neighbor classifier, or a classifier based on dynamic time warping, or another time series classifier may be used for situations where progression data is available.

Embodiment C: Semi-supervised anomaly detection. This approach relies on data from patients with or without progression of complications of DM to build a model of lack of progression. This model may be statistical in nature, such as a distribution of foot temperature values from patients with or without progression of complications. A statistical test may then be applied to determine whether new patient foot temperature data belongs to this baseline model or whether it is distinct, the latter case indicating the progression of complications of diabetes mellitus PAD or PDN.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product (or in a computer process) for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The medium also may be a non-transient medium. The series of computer instructions can embody all or part of the functionality previously described herein with respect to the system. The processes described herein are merely exemplary and it is understood that various alternatives, mathematical equivalents, or derivations thereof fall within the scope of the present invention.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the larger network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention.

What is claimed is:

1. A monitor for managing peripheral diabetic neuropathy ("PDN") and/or peripheral arterial disease ("PAD") of a patient having a foot with a bottom surface, the monitor comprising:

a body having a base with a top surface, the top surface of the base having a thermally conductive receiving region, the base forming an open platform or a closed platform, the body having a set of temperature sensors forming a sensor system disposed on a movable layer so as to conform to a user's foot, the sensor system in communication with the top surface of the receiving region, the set of temperature sensors being contact temperature sensors or non-contact temperature sensors, the set of temperature sensors being spaced apart within the receiving region and configured to activate after receipt of a stimulus applied to one or both the open or closed platform and the set of temperature sensors, the set of temperature sensors configured to thermally communicate with the bottom of the foot within the receiving region to ascertain a current temperature at each of a set of different spaced apart locations of the bottom of the foot, the set of temperature sensors configured to produce a set of temperature values with each location having one associated temperature value, the set of temperature sensors configured to produce a current set of temperature values after contacting the receiving region with the bottom surface of the patient's foot;

a computer-implemented normalizer in communication with the set of temperature sensors of the body to receive the current set of temperature values, and configured to set a normalization reference for 1) four or more earlier sets of temperature values, produced at earlier times, for the bottom surface of the patient's foot and 2) the current set of temperature values to produce normalized data by normalizing both said four or more earlier sets of temperature values and said current set of temperature values against the normalization reference; and a computer-implemented modeler operatively coupled with the normalizer, the modeler configured to transform the normalized data into model information representing a progression of PDN or PAD, the modeler configured to ascertain, using the model information, a trajectory of the patient's PDN or PAD.

2. The monitor as defined by claim 1 wherein each one of the earlier sets of temperature values is temporally spaced from other earlier sets of temperature values by a time period of at least one day.

3. The monitor as defined by claim 1 the normalizer is configured to apply a normalizing function to the earlier sets of temperature values and the current set of temperature values using the normalization reference to produce the normalized data, the normalizing reference including one or more contralateral temperature values.

4. The monitor as defined by claim 1 the normalizer is configured to apply a normalizing function to the earlier sets of temperature values and the current set of temperature values using the normalization reference to produce the normalized data, the normalizing reference including one or more ipsilateral temperature values.

5. The monitor as defined by claim 1 the normalizer is configured to apply a normalizing function to the earlier sets of temperature values and the current set of temperature values using the normalization reference to produce the normalized data, the normalizing reference including one or more ambient temperature values.

6. The monitor as defined by claim 1 wherein said four or more earlier sets of temperature values comprises between four earlier sets and 10,000 earlier sets.

7. The monitor as defined by claim 1 wherein the modeler is configured to:
   select a model to characterize the normalized data as a simpler system; and
   apply the model to the normalized data to produce the model information.

8. The monitor as defined by claim 1 further comprising a predictor configured, using the model information, to predict a future status of PDN or PAD for the patient relative to the current set of temperature values.

9. The monitor as defined by claim 1 wherein the trajectory comprises one or both of a rate of change of the model information and the magnitude of the model information.

10. The monitor as defined by claim 1 wherein the modeler is configured to transform, with respect to the normalization reference, the plurality of earlier sets of temperature values and the current set of temperature values into model information representing the progression of PDN,
   further wherein the modeler is configured to ascertain, using the information, the trajectory of the patient's PDN.

11. The monitor as defined by claim 1 wherein the modeler is configured to transform, with respect to the normalization reference, the plurality of earlier sets of temperature values and current set of temperature values into model information representing a progression of PAD,
   further wherein the modeler is configured to ascertain, using the information, the trajectory of the patient's PAD.

12. A method of monitoring peripheral diabetic neuropathy ("PDN") and/or peripheral arterial disease ("PAD") of a patient having a foot with a bottom surface, the method comprising:
   providing a body having A method of monitoring peripheral diabetic neuropathy ("PDN") and/or peripheral arterial disease ("PAD") of a patient having a foot with a bottom surface, the method comprising:
   providing a body having a base with a top surface, the top surface of the base having a thermally conductive receiving region, the base forming an open platform or a closed platform,
   the body having a set of temperature sensors forming a sensor system and disposed on a movable layer so as to conform to a user's foot, the sensor system in communication with the top surface of the receiving region, the set of temperature sensors being contact temperature sensors or non-contact temperature sensors and being within the receiving region and configured to activate after receipt of a stimulus applied to one or both the open or closed platform and the set of temperature sensors, the set of temperature sensors configured to thermally communicate with the bottom of the foot within the receiving region to ascertain a current temperature at each of a set of different locations of the bottom of the foot, the set of temperature sensors configured to produce a set of temperature values with each location having one associated temperature value;
   contacting the bottom surface of the patient's foot with the receiving region to cause the set of temperature sensors to produce a current set of temperature values;
   accessing, with a computer, four or more earlier sets of temperature values produced at earlier times for the bottom surface of the patient's foot;
   setting, with the computer, a normalization reference for the four or more earlier sets of temperature values and the current set of temperature values to produce normalized data by normalizing both said four or more earlier sets of temperature values and said current set of temperature values against the normalization reference;
   transforming, with the computer, the normalized data into model information representing a progression of PDN or PAD; and
   ascertaining, with the computer using the model information, the trajectory of the patient's PDN or PAD.

13. The method as defined by claim 12 wherein each one of the earlier sets of temperature values is temporally spaced from other earlier sets of temperature values by a time period of at least one day.

14. The method as defined by claim 12 wherein said setting a normalization reference comprises applying a normalizing function to the earlier sets of temperature values and the current set of temperature values using the normalization reference,
   the normalizing reference including one or more contralateral temperature values.

15. The method as defined by claim 12 wherein said setting a normalization reference comprises applying a normalizing function to the earlier sets of temperature values and the current set of temperature using the normalization reference,
   the normalizing reference including one or more ipsilateral temperature values.

16. The method as defined by claim 12 said wherein setting a normalization reference comprises applying a normalizing function to the earlier sets of temperature values and the current set of temperature values using the normalization reference,
   the normalizing reference including one or more ambient temperature values.

17. The method as defined by claim 12 wherein said accessing four or more earlier sets of temperature values produced at earlier times for the bottom surface of the patient's foot comprises accessing between four earlier sets of temperature values produced at earlier times for the bottom surface of the patient and 10,000 earlier sets of temperature values produced at earlier times for the bottom surface of the patient.

18. The method as defined by claim 12 wherein said transforming comprises:
   selecting a model to characterize the normalized data as a simpler system; and
   applying the model to the normalized data to produce the model information.

19. The method as defined by claim 12 further comprising predicting, using the model information, a future status of PDN or PAD for the patient relative to the current set of temperature values.

20. The method as defined by claim 12 wherein the trajectory comprises one or both of a rate of change of the model information and the magnitude of the model information.

21. The method as defined by claim 12 wherein said transforming comprises transforming, with respect to the normalization reference, the four or more earlier sets of temperature values and current set of temperature values into model information representing the progression of PDN,
   further wherein said ascertaining comprises ascertaining, using the information, the trajectory of the patient's PDN.

22. The method as defined by claim 12 wherein said transforming comprises transforming, with respect to the normalization reference, the four or more earlier sets of temperature values and current set of temperature values into model information representing the progression of PAD,
further wherein said ascertaining comprises ascertaining, using the information, the trajectory of the patient's PAD.

23. The method as defined by claim 12 further comprising producing, using the set of temperature sensors, the earlier sets of temperature values.

24. A system for monitoring peripheral diabetic neuropathy ("PDN") and/or peripheral arterial disease ("PAD") of a patient having a foot with a bottom surface, the system comprising:
a body having a base with a top surface, the top surface of the base having a thermally conductive receiving region, the base forming an open platform or a closed platform,
the body having a set of temperature sensors forming a sensor system and disposed on a movable layer so as to conform to a user's foot, the sensor system in communication with the top surface of the receiving region, the set of temperature sensors being contact temperature sensors or non-contact temperature sensors, the set of temperature sensors being spaced apart within the receiving region and configured to activate after receipt of a stimulus applied to one or both the open or closed platform and the set of temperature sensors, the set of temperature sensors configured to thermally communicate with the bottom of the foot within the receiving region to ascertain a current temperature at each of a set of different spaced apart locations of the bottom of the foot, the set of temperature sensors configured to produce a set of temperature values with each location having one associated temperature value,
the set of temperature sensors configured to produce a current set of temperature values after contacting the receiving region with the bottom surface of the patient's foot; and
a computer program product for use on a computer system, the computer program product comprising a tangible, non-transient computer usable medium having computer readable program code thereon, the computer readable program code comprising:
computer readable program code which, when executed by a computer, causes the computer to receive, from the body, the current set of temperature values;
computer readable program code which, when executed by a computer, causes the computer to receive four or more earlier sets of temperature values produced at earlier times for the bottom surface of the patient's foot;
computer readable program code which, when executed by the computer, causes the computer to set a normalization reference for the earlier sets of temperature values and the current set of temperature values to produce normalized data by normalizing both said four or more earlier sets of temperature values and said current set of temperature values against the normalization reference;
computer readable program code which, when executed by the computer, causes the computer to transform the normalized data into model information representing a progression of PDN or PAD; and
computer readable program code which, when executed by the computer, causes the computer to ascertain, using the model information, a trajectory of the patient's PDN or PAD.

25. The system as defined by claim 24 wherein each one of the earlier sets of temperature values is temporally spaced from other earlier sets of temperature values by a time period of at least one day.

26. The system as defined by claim 24 said program code for setting a normalization reference comprises program code for applying a normalizing function to the earlier sets of temperature values and the current set of temperature values using the normalization reference,
the normalizing reference including one or more contralateral temperature values.

27. The system as defined by claim 24 said program code for setting a normalization reference comprises program code for applying a normalizing function to the earlier sets of temperature values and the current set of temperature values using the normalization reference,
the normalizing reference including one or more ipsilateral temperature values.

28. The system as defined by claim 24 said program code for setting a normalization reference comprises program code for applying a normalizing function to the earlier sets of temperature values and the current set of temperature values using the normalization reference,
the normalizing reference including one or more ambient temperature values.

29. The system as defined by claim 24 wherein said program code for accessing four or more earlier sets comprises accessing between four earlier sets and 10,000 earlier sets.

30. The system as defined by claim 24 wherein said program code for transforming comprises:
program code for selecting a model to characterize the normalized data as a simpler system; and
program code for applying the model to the normalized data to produce the model information.

31. The system as defined by claim 24 further comprising program code which, when executed by the computer, causes the computer, using the model information, to predict a future status of PDN or PAD for the patient relative to the current set of temperature values.

32. The system as defined by claim 24 wherein the trajectory comprises one or both of a rate of change of the model information and the magnitude of the model information.

33. The system as defined by claim 24 wherein said program code for transforming comprises program code for transforming, with respect to the normalization reference, the plurality of earlier sets of temperature values and current set of temperature values into model information representing the progression of PDN,
further wherein said program code for ascertaining comprises program code for ascertaining, using the information, the trajectory of the patient's PDN.

34. The system as defined by claim 24 wherein said program code for transforming comprises program code for transforming, with respect to the normalization reference, the plurality of earlier sets of temperature values and current set of temperature values into model information representing the progression of PAD,
further wherein said program code for ascertaining comprises program code for ascertaining, using the information, the trajectory of the patient's PAD.

* * * * *